US010567789B2

(12) United States Patent
Chen et al.

(10) Patent No.: US 10,567,789 B2
(45) Date of Patent: Feb. 18, 2020

(54) SIMPLIFIED SHIFTING MERGE CANDIDATE AND MERGE LIST DERIVATION IN 3D-HEVC

(71) Applicants: QUALCOMM Incorporated, San Diego, CA (US); Ying Chen, San Diego, CA (US); Hongbin Liu, Beijing (CN)

(72) Inventors: Ying Chen, San Diego, CA (US); Hongbin Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 15/318,340

(22) PCT Filed: Jun. 16, 2014

(86) PCT No.: PCT/CN2014/079916
§ 371 (c)(1),
(2) Date: Dec. 12, 2016

(87) PCT Pub. No.: WO2015/192286
PCT Pub. Date: Dec. 23, 2015

(65) Prior Publication Data
US 2017/0127082 A1 May 4, 2017

(51) Int. Cl.
H04N 19/52 (2014.01)
H04N 19/56 (2014.01)
(Continued)

(52) U.S. Cl.
CPC ........... H04N 19/52 (2014.11); H04N 19/176 (2014.11); H04N 19/517 (2014.11); H04N 19/56 (2014.11); H04N 19/70 (2014.11)

(58) Field of Classification Search
CPC .... H04N 19/176; H04N 19/517; H04N 19/52; H04N 19/56; H04N 19/70
See application file for complete search history.

(56) References Cited

U.S. PATENT DOCUMENTS 9,113,163 B2 8/2015 Oh
9,357,214 B2 5/2016 Zhang et al.
(Continued)

FOREIGN PATENT DOCUMENTS

CN 102946536 A 2/2013
CN 103152562 A 6/2013
(Continued)

OTHER PUBLICATIONS

3D-HEVC Test Model 4, Apr. 20-26, 2013, Joint Collaborative Team on 3D Video Coding Extension Development of ITU-T SG 16 WP 3 and ISO/IEC JTC 1/SC 29/WG 11 4th Meeting: Incheon, KR, Apr. 20-26, 2013 (hereinafter TestModel4).*
(Continued)

Primary Examiner — Mohammed S Rahaman
(74) Attorney, Agent, or Firm — Shumaker & Sieffert, P.A.

(57) ABSTRACT

A device for coding three-dimensional includes a video coder configured to add one or more motion vector candidates to a motion vector candidate list; identify, from the one or more motion vector candidates in the motion vector candidate list, a disparity motion vector candidate; based on the disparity motion vector candidate, determine a disparity shifted motion vector (DSMV) candidate; and add the DSMV candidate to the motion vector candidate list; and code the block of video data using a motion vector corresponding to the identified candidate.

28 Claims, 15 Drawing Sheets

(51) Int. Cl.
  *H04N 19/70* (2014.01)
  *H04N 19/517* (2014.01)
  *H04N 19/176* (2014.01)

(56) References Cited

U.S. PATENT DOCUMENTS

| | | | |
|---|---|---|---|
| 9,451,249 | B2 | 9/2016 | Oh et al. |
| 9,609,347 | B2 | 3/2017 | Thirumalai et al. |
| 9,716,899 | B2 | 7/2017 | Thirumalai et al. |
| 9,800,895 | B2 | 10/2017 | Thirumalai et al. |
| 2011/0044550 | A1* | 2/2011 | Tian .................. H04N 19/597 382/238 |
| 2012/0320984 | A1* | 12/2012 | Zhou .................. H04N 19/50 375/240.16 |
| 2013/0107965 | A1 | 5/2013 | Wahadaniah et al. |
| 2013/0176390 | A1 | 7/2013 | Chen et al. |
| 2014/0071235 | A1 | 3/2014 | Zhang et al. |
| 2014/0092968 | A1* | 4/2014 | Guillemot .............. H04N 19/52 375/240.14 |
| 2014/0355688 | A1 | 12/2014 | Lim et al. |
| 2015/0215640 | A1 | 7/2015 | Lin |

FOREIGN PATENT DOCUMENTS

| | | |
|---|---|---|
| CN | 103370940 A | 10/2013 |
| CN | 103688545 A | 3/2014 |
| WO | 2013109093 A1 | 7/2013 |
| WO | 2013159038 A1 | 10/2013 |
| WO | 2014005503 A1 | 1/2014 |
| WO | 2014054684 A1 | 4/2014 |
| WO | 2014089475 A1 | 6/2014 |

OTHER PUBLICATIONS

International Preliminary Report on Patentability from International Application No. PCT/CN2014/079916, dated Dec. 29, 2016, 7 pp.
Guillemot C., et al., "3D-CE5.h: Additional merge candidates derived from shifted disparity candidate predictors," 3. JCT-3V Meeting, 103. MPEG Meeting, Jan. 17, 2013-Jan. 23, 2013; Geneva, (The Joint Collaborative Team on 3D Video Coding Extension Development of ISO/IEC JTC1/SC29/WG11 and ITU-T SG.16 ), URL: http://phenix.int-evry.fr/jct2/, No. JCT3V-C0148, Jan. 10, 2013 (Jan. 10, 2013), XP030130564, pp. 1-6.
Guionnet T., et al., "3D-CE5.h: Merge Candidate List for Disparity Compensated Prediction,", 2. JCT-3V Meeting; 102. MPEG Meeting; Oct. 13, 2012-Oct. 19, 2012, Shanghai, (The Joint Collaborative Team on 3D Video Coding Extension Development of ISO/IEC JTC1/SC29/WG11 and ITU-T SG.16); URL: http://phenix.int-evry.fr/jct2/, No. JCT3V-B0080, Oct. 8, 2012 (Oct. 8, 2012), 6 Pages.
Guionnet T., et al., "CE5.h related: Merge candidate list extension for disparity compensated prediction," 1. JCT-3V Meeting; 101. MPEG Meeting; Jul. 16, 2012-Jul. 20, 2012; Stockholm; No. JCT2-A0134, Jul. 10, 2012 (Jul. 10, 2012), XP030130133, pp. 1-3.
Zhang L, et al., "3D-CE5.h: Merge Candidates Derivation from Disparity Vector Shifting," 3. JCT-3V Meeting; 103. MPEG Meeting; Jan. 17, 2013-Jan. 23, 2013; Geneva; (The Joint Collaborative Team on 3d Video Coding Extension Development of ISO/IEC JTC1/SC29/WG11 and ITU-T SG.16); URL: http://phenix.int-evry.fr/jct2/, No. JCT3V-00045, Jan. 10, 2013 (Jan. 10, 2013), pp. 1-4.
International Search Report and Written Opinion from International Application No. PCT/CN2014/079916, dated Mar. 16, 2015, 15 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.264, Series H: Audiovisual and Multimedia Systems, Infrastructure of audiovisual services—Coding of moving video, Advanced video coding for generic audiovisual services, The International Telecommunication Union. Mar. 2010, 676 pp.
Zhang et al., "Test Model 6 of 3D-HEVC and MV-HEVC", 6th Meeting, Oct. 25 through Nov. 1, 2013, Geneva Switzerland, Joint Collaborative Team on 3D Video Coding Extension Development of ITU-T SG 16 WP 3 and ISO/IEC JTC 1/SC 29/WG 11, JCT3V-F1005, Dec. 16, 2013, 57 pp.
Tech et al., "3D-HEVC Draft Text 2", 6th Meeting, Oct. 25 through Nov. 1, 2013, Geneva Switzerland, Joint Collaborative Team on 3D Video Coding Extension Development of ITU-T SG 16 WP 3 and ISO/IEC JTC 1/SC 29/WG 11, JCT3V-F1001-v4, Dec. 14, 2013, 94 pp.
Zhang et al., "CE5.h: Disparity vector generation results", 1st Meeting, Jul. 16 through 20, 2012, Stockholm, Sweden, Joint Collaborative Team on 3D Video Coding Extension Development of ITU-T SG 16 WP 3 and ISO/IEC JTC 1/SC 29/WG 11, JCT3V-A0097, Jul. 11, 2012, 5 pp.
Sung et al., "3D-CE5.h: Simplification of disparity vector derivation for HEVC-based 3D video coding", 1st Meeting, Jul. 16 through 20, 2012, Stockholm, Sweden, Joint Collaborative Team on 3D Video Coding Extension Development of ITU-T SG 16 WP 3 and ISO/IEC JTC 1/SC 29/WG 11, JCT3V-A0126, Jul. 14, 2012, 4 pp.
Kang et al., "3D-CE5.h related: Improvements for disparity vector derivation", 2nd Meeting, Oct. 13 through 29, 2012, Shanghai, China, Joint Collaborative Team on 3D Video Coding Extension Development of ITU-T SG 16 WP 3 and ISO/IEC JTC 1/SC 29/WG 11, JCT3V-B0047, Oct. 10, 2012, 4 pp.
Kang et al., "CE2.h related: CU-based Disparity Vector Derivation in 3D-HEVC", 4th Meeting, Apr. 20 through 26, 2013, Incheon, KR, Joint Collaborative Team on 3D Video Coding Extensions of ITU-T SG 16 WP 3 and ISO/IEC JTC 1/SC 29/WG 11, JCT3V-D0181-v1, Apr. 13, 2013, 4 pp.
Kang et al., "CE2.h related: CU-based Disparity Vector Derivation in 3D-HEVC", 4th Meeting, Apr. 20 through 26, 2013, Incheon, KR, Joint Collaborative Team on 3D Video Coding Extensions of ITU-T SG 16 WP 3 and ISO/IEC JTC 1/SC 29/WG 11, JCT3V-D0181-v2, Apr. 13, 2013, 4 pp.
Kang et al., "JCT3V-D0181: CE2.h related: CU-based Disparity Vector Derivation", Powerpoint Presentation, 4th Meeting, Apr. 20 through 26, 2013, Incheon, KR, Joint Collaborative Team on 3D Video Coding Extensions of ITU-T SG 16 WP 3 and ISO/IEC JTC 1/SC 29/WG 11, JCT3V-D0181-v2, Apr. 13, 2013, 7 pp.
An et al., "3D-CE3: Sub-PU level inter-view motion prediction", 6th Meeting, Oct. 25 through Nov. 1, 2013, Geneva, Switzerland, Joint Collaborative Team on 3D Video Coding Extension Development of ITU-T SG 16 WP 3 and ISO/IEC JTC 1/SC 29/WG 11, JCT3V-F0110, Oct. 19, 2013, 4 pp.
Tech et al., "3D-HEVC Draft Text 4", 8th Meeting, Mar. 29 through Apr. 4, 2014, Valencia, Spain, Joint Collaborative Team on 3D Video Coding Extensions of ITU-T SG 16 WP 3 and ISO/IEC JTC 1/SC 29/WG 11, JCT3V-H1001-v2, May 18, 2014, 102 pp.
Tech et al., "3D-Hevc Draft Text 3", 7th Meeting, Jan. 9 through 17, 2014, San Jose, USA, Joint Collaborative Team on 3D Video Coding Extension Development of ITU-T SG 16 WP 3 and ISO/IEC JTC 1/SC 29/WG 11, JCT3V-G1001-v2, Mar. 10, 2014, 102 pp.
Zhang et al., "Test Model 7 of 3D-HEVC and MV-HEVC", 7th Meeting, Jan. 11 through 17, 2014, San Jose, USA, Joint Collaborative Team on 3D Video Coding Extension Development of ITU-T SG 16 WP 3 and ISO/IEC JTC 1/SC 29/WG 11, JCT3V-G1005, Feb. 14, 2014, 56 pp.
Tian et al., "CE1.h: Backward View Synthesis Prediction using Neighbouring Blocks", 3rd Meeting, Jan. 17 through 23, 2013, Geneva, Switzerland, Joint Collaborative Team on 3D Video Coding Extension Development of ITU-T SG 16 WP 3 and ISO/IEC JTC 1/SC 29/WG 11, JCT3V-00152-r1, Jan. 21, 2013, 5 pp.
Tian et al., "CE1.h: Backward View Synthesis Prediction using Neighbouring Blocks", 3rd Meeting, Jan. 17 through 23, 2013, Geneva, Switzerland, Joint Collaborative Team on 3D Video Coding Extension Development of ITU-T SG 16 WP 3 and ISO/IEC JTC 1/SC 29/WG 11, JCT3V-00152, Jan. 21, 2013, 5 pp.

(56) References Cited

OTHER PUBLICATIONS

Tian et al., "JCT3v-C0152: CE1.h: Backward View Synthesis Prediction using Neighbouring Blocks", powerpoint presentation, 3rd Meeting, Jan. 17 through 23, 2013, Geneva, Switzerland, Joint Collaborative Team on 3D Video coding Extension Development of ITU-T SG 16 WP 3 and ISO/IEC JTC 1/SC 29/WG 11, JCT3V-C0152, Jan. 21, 2013, 14 pp.

ITU-T HH.223, Series H: Audiovisual and Multimedia Systems, Infrastructure of audiovisual services—Transmission multiplexing and synchronization, Multiplexing protocol for low bit rate multimedia communication, The International Telecommunication Union. Jul. 2001, 74 pp.

Supplementary European Search Report—EP14895230—Search Authority—Munich—Nov. 29, 2017 6 pages.

Tech G., et al., "3D-HEVC Draft Text 3," Joint Collaborative Team on 3D Video Coding Extension Development of ITU-T SG16 WP3 and ISO/IEC JTC1/SC29/WG11/JCT3V-G1001-V3, Mar. 1, 2014, XP055358694, pp. 1-94.

Thirumalai V., et al., "CE3.h: Merge Candidates Derivation from Vector Shilling," MPEG Meeting; Aug. 2, 2013, Vienna, AT; (The Joint Collaborative Team on 3D Video Coding Extension Development of ISO/IEC JTC1/SC29/WG11 and ITU-T SG.16); Document: JCT3V-E0126, 5 pp.

Thirumalai V., et al., "CE5.h: Merge candidates derivation from vector shifting," 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16); No. JCT3V-D0178, Apr. 13, 2013 (Apr. 13, 2013), pp. 1-5, XP030130842, URL: http://phenix.int-evry.fr/jct2/, the whole document.

Zhang L, et al., "3D-CE5.h: Merge Candidates Derivation from Disparity Vector," Joint Collaborative Team on 3D Video Coding Extension Development of ITU-T SG 16 WP 3 and ISO/IEC JTC 1/SC 29/WG 11, Document: JCT3V-B0048, Qualcomm Incorporated, 2nd Meeting: Shanghai, CN, Oct. 13-19, 2012, XP030130229, 4 pages.

Zhao X., et al., "CE3: Inter-view motion vector prediction for depth coding," 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); No. JCT3V-F0125, Oct. 18, 2013 (Oct. 18, 2013), pp. 1-6, XP030131550, URL: http://phenix.int-evry.fr/jct2/, the whole document.

Liu H., et al., "Simplifications for 3D-HEVC Merge Candidate List Generation", Joint Collaborative Team on 3D Video Coding Extensions, ITU-T SG 16 WP 3 and ISO/IEC JTC 1/SC 29/W, 9th Meeting: Sapporo, JP, Jun. 2014, JCT3V-I0053, pp. 1-8.

* cited by examiner

SIMPLIFIED SHIFTING MERGE CANDIDATE AND MERGE LIST DERIVATION IN 3D-HEVC

This application is a national stage entry under 35 U.S.C. § 371 of International Application No. PCT/CN2014/079916, filed Jun. 16, 2014.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Extensions of some of the aforementioned standards, including H.264/AVC, may provide techniques for multiview video coding in order to produce stereo or three-dimensional ("3D") video. In particular, techniques for multiview coding have been proposed for use in AVC, with the scalable video coding (SVC) standard (which is the scalable extension to H.264/AVC), and the multi-view video coding (MVC) standard (which has become the multiview extension to H.264/AVC).

Typically, stereo video is achieved using two views, e.g., a left view and a right view. A picture of the left view can be displayed substantially simultaneously with a picture of the right view to achieve a three-dimensional video effect. For example, a user may wear polarized, passive glasses that filter the left view from the right view. Alternatively, the pictures of the two views may be shown in rapid succession, and the user may wear active glasses that rapidly shutter the left and right eyes at the same frequency, but with a 90 degree shift in phase.

SUMMARY

This disclosure is related to the simplification of motion vector candidate derivation and the addition of new candidates for 3D-HEVC coding processes, such as for merge mode and/or advanced motion vector prediction (AMVP), that utilize motion vector candidate lists.

In one example, a method of decoding three-dimensional (3D) video data includes adding one or more motion vector candidates to a motion vector candidate list; identifying, from the one or more motion vector candidates in the motion vector candidate list, a disparity motion vector candidate; based on the disparity motion vector candidate, determining a disparity shifted motion vector (DSMV) candidate; adding the DSMV candidate to the motion vector candidate list; for a block of video data, receiving an index value identifying a candidate from the motion vector candidate list; and, decoding the block of video data using a motion vector corresponding to the identified candidate.

In another example, a method of encoding three-dimensional (3D) video data includes adding one or more motion vector candidates to a motion vector candidate list; identifying, from the one or more motion vector candidates in the motion vector candidate list, a disparity motion vector candidate; based on the disparity motion vector candidate, determining a disparity shifted motion vector (DSMV) candidate; adding the DSMV candidate to the motion vector candidate list; for a block of video data, determining a motion vector for encoding the block of video data, wherein the motion vector corresponds to a candidate in the motion vector candidate list; generating a syntax element identifying the candidate in the motion vector candidate list.

In another example, a method of decoding 3D video data includes analyzing one or more spatial neighboring blocks of a current block to determine one or more first motion vector candidates for inclusion in a temporary motion vector candidate list; analyzing one or more temporal neighboring blocks to determine one or more second motion vector candidates for inclusion in the temporary motion vector candidate list; determining, based on a disparity vector for the current block, one or more additional candidates for inclusion in the temporary motion vector candidate list, wherein the one or more first motion vector candidates, the one or more second motion vector candidates, and the one or more additional candidates comprise more candidates than a maximum number of candidates in a motion vector candidate list; removing from the temporary motion vector candidate list, candidates with an index that is greater than a maximum index for the motion vector candidate list; for a block of video data, receiving an index value identifying a candidate from the motion vector candidate list; and, decoding the block of video data using a motion vector corresponding to the identified candidate.

In another example, a method of encoding 3D video data includes analyzing one or more spatial neighboring blocks of a current block to determine one or more first motion vector candidates for inclusion in a temporary motion vector candidate list; analyzing one or more temporal neighboring blocks to determine one or more second motion vector candidates for inclusion in the temporary motion vector candidate list; determining, based on a disparity vector for the current block, one or more additional candidates for inclusion in the temporary motion vector candidate list, wherein the one or more first motion vector candidates, the one or more second motion vector candidates, and the one or more additional candidates comprise more candidates than a maximum number of candidates in a motion vector candidate list; removing from the temporary motion vector candidate list, candidates with an index that is greater than a maximum index for the motion vector candidate list; for a block of video data, determining a motion vector for encoding the block of video data, wherein the motion vector corresponds to a candidate in the motion vector candidate list; and, generating a syntax element identifying the candidate in the motion vector candidate list.

In another example, a method of decoding 3D video data includes adding one or more spatial neighboring block candidates to a motion vector candidate list; adding one or more temporal neighboring block candidates to a motion vector candidate list; determining an additional candidates based on a disparity vector; comparing the additional candidate to a candidate from a fixed position in the motion vector candidate list; for a block of video data, receiving an index value identifying a candidate from the motion vector candidate list; and, decoding the block of video data using a motion vector corresponding to the identified candidate.

In another example, a method of encoding 3D video data includes adding one or more spatial neighboring block candidates to a motion vector candidate list; adding one or more temporal neighboring block candidates to a motion vector candidate list; determining an additional candidates based on a disparity vector; comparing the additional candidate to a candidate from a fixed position in the motion vector candidate list; for a block of video data, receiving an index value identifying a candidate from the motion vector candidate list; for a block of video data, determining a motion vector for encoding the block of video data, wherein the motion vector corresponds to a candidate in the motion vector candidate list; and, generating a syntax element identifying the candidate in the motion vector candidate list.

In another example, a device for 3D video data includes a video coder configured to add one or more motion vector candidates to a motion vector candidate list; identify, from the one or more motion vector candidates in the motion vector candidate list, a disparity motion vector candidate; based on the disparity motion vector candidate, determine a disparity shifted motion vector (DSMV) candidate; add the DSMV candidate to the motion vector candidate list; and code the block of video data using a motion vector corresponding to the identified candidate.

In another example, a device for 3D video data includes a video coder configured to analyze one or more spatial neighboring blocks of a current block to determine one or more first motion vector candidates for inclusion in a temporary motion vector candidate list; analyze one or more temporal neighboring blocks to determine one or more second motion vector candidates for inclusion in the temporary motion vector candidate list; determine, based on a disparity vector for the current block, one or more additional candidates for inclusion in the temporary motion vector candidate list, wherein the one or more first motion vector candidates, the one or more second motion vector candidates, and the one or more additional candidates comprise more candidates than a maximum number of candidates in a motion vector candidate list; and remove from the temporary motion vector candidate list, candidates with an index that is greater than a maximum index for the motion vector candidate list.

In another example, a device for 3D video data includes a video coder configured to add one or more spatial neighboring block candidates to a motion vector candidate list; add one or more temporal neighboring block candidates to a motion vector candidate list; determine an additional candidates based on a disparity vector; compare the additional candidate to a candidate from a fixed position in the motion vector candidate list.

In another example, a computer-readable storage medium stores instructions that when executed by one or more processors cause the one or more processors to add one or more motion vector candidates to a motion vector candidate list; identify, from the one or more motion vector candidates in the motion vector candidate list, a disparity motion vector candidate; based on the disparity motion vector candidate, determine a disparity shifted motion vector (DSMV) candidate; and add the DSMV candidate to the motion vector candidate list.

In another example, a computer-readable storage medium stores instructions that when executed by one or more processors cause the one or more processors to analyze one or more spatial neighboring blocks of a current block to determine one or more first motion vector candidates for inclusion in a temporary motion vector candidate list; analyze one or more temporal neighboring blocks to determine one or more second motion vector candidates for inclusion in the temporary motion vector candidate list; determine, based on a disparity vector for the current block, one or more additional candidates for inclusion in the temporary motion vector candidate list, wherein the one or more first motion vector candidates, the one or more second motion vector candidates, and the one or more additional candidates comprise more candidates than a maximum number of candidates in a motion vector candidate list; and, remove from the temporary motion vector candidate list, candidates with an index that is greater than a maximum index for the motion vector candidate list.

In another example, a computer-readable storage medium stores instructions that when executed by one or more processors cause the one or more processors to add one or more spatial neighboring block candidates to a motion vector candidate list; add one or more temporal neighboring block candidates to a motion vector candidate list; determine an additional candidates based on a disparity vector; and compare the additional candidate to a candidate from a fixed position in the motion vector candidate list.

In another example, device for coding 3D video data includes means for adding one or more motion vector candidates to a motion vector candidate list; means for identifying, from the one or more motion vector candidates in the motion vector candidate list, a disparity motion vector candidate; means for determining a disparity shifted motion vector (DSMV) candidate based on the disparity motion vector candidate; means for adding the DSMV candidate to the motion vector candidate list; means for coding the block of video data using a motion vector from the motion vector candidate list; means for coding the block of video data using a motion vector from the motion vector candidate list.

In another example, device for coding 3D video data includes means for analyzing one or more spatial neighboring blocks of a current block to determine one or more first motion vector candidates for inclusion in a temporary motion vector candidate list; means for analyzing one or more temporal neighboring blocks to determine one or more second motion vector candidates for inclusion in the temporary motion vector candidate list; means for determining, based on a disparity vector for the current block, one or more additional candidates for inclusion in the temporary motion vector candidate list, wherein the one or more first motion vector candidates, the one or more second motion vector candidates, and the one or more additional candidates comprise more candidates than a maximum number of candidates in a motion vector candidate list; means for removing from the temporary motion vector candidate list, candidates with an index that is greater than a maximum index for the motion vector candidate list; and, means for coding the block of video data using a motion vector from the motion vector candidate list.

In another example, device for coding 3D video data includes means for adding one or more spatial neighboring block candidates to a motion vector candidate list; means for adding one or more temporal neighboring block candidates to a motion vector candidate list; means for determining an additional candidates based on a disparity vector; means for comparing the additional candidate to a candidate from a fixed position in the motion vector candidate list; and, means for coding the block of video data using a motion vector from the motion vector candidate list.

The details of one or more examples are set forth in the accompanying drawings and the description below. Other features, objects, and advantages will be apparent from the description and drawings, and from the claims.

DETAILED DESCRIPTION

Figure 1:
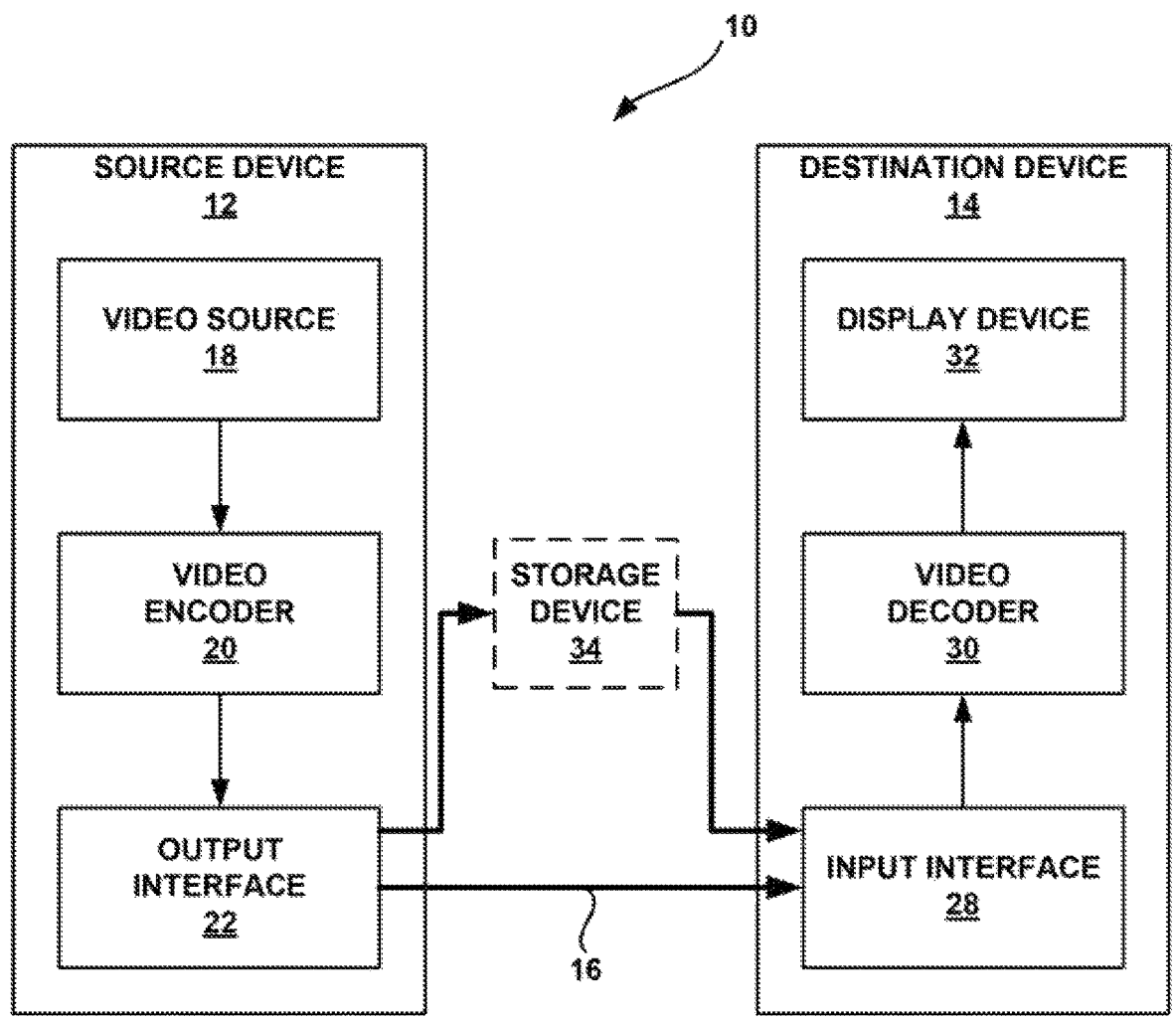
FIG. 1 is a block diagram illustrating an example video encoding and decoding system that may utilize the techniques described in this disclosure.

This disclosure is related to the simplification of motion vector candidate derivation and the addition of new candidates for 3D-HEVC coding processes, such as for merge mode and/or advanced motion vector prediction (AMVP), that utilize motion vector candidate lists. Motion vector candidate lists are also referred to herein as candidate lists, and when referring to merge mode, may also be referred to as merge candidate lists or merge lists. A video encoder may perform inter prediction to reduce redundancy between pictures of different temporal instances of the same view or between pictures of the same temporal instances of different views. As described below, a coding unit (CU) may have a plurality of prediction units (PUs). In other words, a plurality of PUs may belong to the CU. When the video encoder performs inter prediction, the video encoder may signal motion information for the PUs. The motion information of a PU may include, for example, a reference picture index, a motion vector, and a prediction direction indicator.

A temporal motion vector may indicate a displacement between a video block of the PU and a reference block of the PU in a reference frame that is of a different time instance but from the same view. A disparity motion vector (DMV) may indicate a displacement between a video block of the PU and a reference block of the PU in a reference frame that is of the same time instance but from a different view. The reference block of the PU may be a portion of the reference picture that is similar to the video block of the PU, and therefore. The reference block may be located in a reference picture indicated by the reference picture index and the prediction direction indicator.

To reduce the number of bits required to represent the motion information of the PUs, the video encoder may generate candidate lists for each of the PUs according to a merge mode or advanced motion vector prediction (AMVP) process. Each candidate in a candidate list for a PU may indicate motion information. The motion information indicated by some of the candidates in the candidate list may be based on the motion information of other PUs. For example, for HEVC merge mode, there may be five spatial candidate locations and one temporal candidate location. As will be explained later, a video decoder may also determine one or more motion vector candidates (3D-HEVC candidates) based on a disparity vector for a PU. In some examples, the video encoder may generate additional candidates by combining partial motion vectors from already determined candidates, modifying candidates, or simply insert zero motion vectors as candidates. These additional candidates are not considered to be original candidates and may be referred to in this disclosure as virtual candidates.

The techniques of this disclosure are generally related to techniques for generating candidate lists at the video encoder and techniques for generating the same candidate lists at a video decoder. A video encoder and a video decoder can generate the same candidate lists by implementing the same techniques for constructing the candidate list. For example, both a video encoder and video decoder may construct lists with the same number of candidates (e.g. five or six candidates for merge mode and two or three candidates for AMVP mode).

After generating the candidate list for a PU of the CU, the video encoder may select a candidate from the candidate list and output a candidate index in a bitstream. The selected candidate may be the candidate that has a motion vector that points to a predictive block that most closely matches the target PU being coded. The candidate index may indicate a position of the selected candidate in the candidate list. The video encoder may also generate a predictive video block for the PU based on a reference block indicated by the motion information of the PU. The motion information of the PU may be determinable based on the motion information indicated by the selected candidate. For instance, in merge mode, the motion information of the PU may be the same as the motion information indicated by the selected candidate. In AMVP mode, the motion information of the PU may be determined based on a motion vector difference of the PU and the motion information indicated by the selected candidate. The video encoder may generate one or more residual video blocks for the CU based on the predictive video blocks of the PUs of the CU and an original video block for the CU. The video encoder may then encode and output the one or more residual video blocks in the bitstream.

The bitstream may include data that identify selected candidates in the candidate lists of the PUs. The video decoder may determine motion information of the PUs based on motion information indicated by the selected candidates in the candidate lists of the PUs. The video decoder may identify one or more reference blocks for the PUs based on the motion information of the PUs. After identifying the one or more reference blocks of a PU, the video decoder may generate a predictive video block for the PU based on the one or more reference blocks of the PU. The video decoder may reconstruct a video block for the CU based on the predictive video blocks for the PUs of the CU and one or more residual video blocks for the CU.

For ease of explanation, this disclosure may describe locations or video blocks as having various spatial relationships with CUs or PUs. Such description may be interpreted to mean that the locations or video blocks have the various spatial relationships to the video blocks associated with the CUs or PUs. Furthermore, this disclosure may refer to a PU that a video coder is currently coding as the current PU. This disclosure may refer to a CU that a video coder is currently coding as the current CU. This disclosure may refer to a picture that a video coder is currently coding as the current picture.

This disclosure will generally use the term HEVC merge mode or HEVC AMVP mode to refer to the merge mode and AMVP mode described in the base HEVC specification. This disclosure will generally use the term 3D-HEVC merge mode and 3D AMVP mode to refer to the merge mode and AMVP mode described in the emerging 3D-HEVC standard. The 3D-HEVC merge mode may use the HEVC merge mode as part of generating a candidate list, but the 3D-HEVC merge mode may modify the HEVC merge mode candidate list to generate a 3D-HEVC merge mode candidate list. When implementing the 3D-HEVC merge mode, for example, a video coder may rearrange the HEVC candidates, add candidates to the HEVC candidates, or remove candidates from the HEVC candidates. Additionally, a 3D-HEVC merge list may include both HEVC candidates and 3D-HEVC candidates, while an HEVC candidate list only includes HEVC candidates. The terms HEVC candidates and 3D-HEVC candidates generally refer to how a candidate is identified and does not necessarily imply what type of motion information (e.g. temporal or inter-view) the candidate includes.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram illustrating an example video encoding and decoding system 10 that may be configured to perform the motion vector candidate list generation techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

System 10 may operate in accordance with different video coding standards, a proprietary standard, or any other way of multiview coding. The following describes a few examples of video coding standards, and should not be considered limiting. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010, the entire content of which is incorporated herein by reference. Another joint draft of the MVC is described in "Advanced video coding for generic audiovisual services," ITU-T Recommendation H.264, June 2011, the entire content of which is incorporated herein by reference. Some additional video coding standards include the MVC+D and 3D-AVC, which are based on AVC. In addition, a new video coding standard, namely the High-Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG).

For purposes of illustration only, some of the techniques described in this disclosure are described with examples in accordance with the 3D-HEVC video coding standard. However, the techniques described in this disclosure should not be considered limited to these example standards, and may be extendable to other video coding standards for multiview coding or 3D video coding (e.g., 3D-AVC), or to techniques related to multiview coding or 3D video coding that are not necessarily based on a particular video coding standard. For example, the techniques described in this disclosure are implemented by video encoders/decoders (codecs) for multiview coding, where multiview coding includes coding of two or more views.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. As will be explained in greater detail below, video encoder 20 may be configured to perform the techniques described in this disclosure. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. As will be explained in greater detail below, video decoder 30 may be configured to perform the techniques described in this disclosure. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. For example, the techniques described in this disclosure may be described from the perspective of an apparatus or a device. As one example, the apparatus or device may include video decoder 30 (e.g., destination device 14 as part of a wireless communication device), and video decoder 30 may include one or more processors configured to implement techniques described in this disclosure (e.g., decode video data in accordance with techniques described in this disclosure). As another example, the apparatus or device may include a micro-processor or an integrated circuit (IC) that includes video decoder 30, and the micro-processor or IC may be part of destination device 14 or another type of device. The same may apply for video encoder 20 (i.e., an apparatus or device like source device 12 and/or a micro-controller or IC includes video encoder 20, where video encoder 20 is configured to encode video data in accordance with techniques described in this disclosure).

When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of video pictures from a view. A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264 standard. The video blocks may have fixed or varying sizes, and may differ in size according to a specified coding standard. Each video picture may include a plurality of slices. Each slice may include a plurality of blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block has 16 pixels in a vertical direction (y=16) and 16 pixels in a horizontal direction (x=16) Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view (e.g., a temporal motion vector), or refers to a reference picture in another view (e.g., a disparity motion vector). The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

In the H.264 standard, following intra-predictive or inter-predictive coding, video encoder 20 calculates residual data for the macroblocks. The residual data may correspond to pixel differences between pixels of the unencoded picture and prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video decoder 30 implements the inverse of the techniques of video encoder 20. For example, video decoder 30 decodes the encoded video bitstream and determines the residual blocks by inverse quantization and inverse transform. Video decoder 30 sums the residual blocks with blocks of previously decoded pictures to determine the pixel values for the blocks within the picture.

Certain techniques described in this disclosure may be performed by both video encoder 20 and video decoder 30. As one example, video encoder 20 may generate motion vector candidate lists as part of determining how to encode a block of video data and/or may generation motion vector candidate lists as part of a decoding loop in the video encoder. Video decoder 30 may perform the same motion vector candidate list generation techniques performed by video encoder 20 as part of decoding the video block. This disclosure may at times refer to video decoder 30 performing certain motion vector candidate list generation techniques described in this disclosure. It should be understood, however, that unless stated otherwise, such techniques may also be performed by video encoder 20.

As described above, the techniques described in this disclosure are directed to 3D video coding. To better understand the techniques, the following describes some H.264/AVC coding techniques, multiview video coding from the perspective of H.264/MVC extension and the High Efficiency Video Coding (HEVC) standard, and 3D-AVC techniques.

For H.264/Advance Video Coding (AVC), video encoding or decoding (e.g., coding) is implemented on macroblocks, where a macroblock represents a portion of a frame which are inter-predicted or intra-predicted (i.e., inter-prediction encoded or decoded or intra-prediction encoded or decoded). For instance, in H.264/AVC, each inter Macroblock (MB) (e.g., inter-predicted macroblock) may be partitioned in four different ways: one 16×16 MB partition, two 16×8 MB partitions, two 8×16 MB partitions, or four 8×8 MB partitions. Different MB partitions in one MB may have different reference index values for each direction (i.e., RefPicList0 or RefPicList1). When a MB is not partitioned into multiple (more than 1) MB partitions, it has only one motion vector for the whole MB partition in each direction.

As part of video coding (encoding or decoding), video encoder 20 and video decoder 30 may be configured to construct one or two reference picture lists, referred to as RefPicList0 and RefPicList1. The reference picture list(s) identify reference pictures that can be used to inter-predict macroblocks of a frame or a slice. For instance, video encoder 20 may signal a reference index and a reference picture list identifier. Video decoder 30 may receive the reference index and the reference picture list identifier and determine the reference picture that is to be used for inter-prediction decoding the current macroblock from the reference index and the reference picture list identifier.

When a MB is partitioned into four 8×8 MB partitions, each 8×8 MB partition can be further partitioned into sub-blocks. There are four different ways to get sub-blocks from an 8×8 MB partition: one 8×8 sub-block, two 8×4 sub-blocks, two 4×8 sub-blocks, or four 4×4 sub-blocks.

Each sub-block can have a different motion vector in each direction, but shares the same reference picture index for each direction. The manner in which an 8×8 MB partition is partitioned into sub-blocks is named sub-block partition.

This disclosure will generally use the term block to refer to any block of video data. For example, in the context of H.264 coding and its extensions, a block may refer to any of macroblocks, macroblock partitions, sub-blocks, or any other types of blocks. In the context of HEVC and its extensions, a block may refer to any of PUs, TUs, CUs, or any other types of blocks. A sub-block as used in this disclosure generally refers to any portion of a larger block. A sub-block may also itself be referred to simply as a block.

For multiview video coding there are multiple different video coding standards. To avoid confusion, when this disclosure describes multiview video coding generically, this disclosure uses the phrase "multiview video coding." In general, in multiview video coding, there is a base view and one or more non-base or dependent views. The base view is fully decodable without reference to any of the dependent views (i.e., the base view is only inter-predicted with temporal motion vectors). This allows a codec that is not configured for multiview video coding to still receive at least one view that is fully decodable (i.e., the base view can be extracted out and the other views discarded, allowing a decoder not configured for multiview video coding to still decode the video content albeit without 3D experience). The one or more dependent views may be inter-predicted with respect to the base view or with respect to another dependent view (i.e., disparity compensation predicted), or with respect to other pictures in the same view (i.e., motion compensated predicted).

Whereas "multiview video coding" is used generically, the acronym MVC is associated with an extension of H.264/AVC. Accordingly, when the disclosure uses the acronym MVC, the disclosure is referring specifically to the extension to H.264/AVC video coding standard. The MVC extension of H.264/AVC relies upon disparity motion vectors as another type of motion vector in addition to temporal motion vectors. Another video coding standard, referred to as MVC plus depth (MVC+D), has also been developed by JCT-3V and MPEG. MVC+D applies the same low-level coding tools as those of MVC for both texture and depth, with the decoding of depth being independent to the decoding of texture and vice-versa. For instance, in MVC, a frame is represented only by one view component, referred to as a texture view component, or simply texture. In MVC+D, there are two view components: texture view component and depth view component, or simply texture and depth. For example, in MVC+D, each view includes a texture view and a depth view, where the view includes a plurality of view components, the texture view includes a plurality of texture view components, and the depth view includes a plurality of depth view components.

Each texture view component is associated with a depth view component to form a view component of a view. The depth view component represents relative depth of the objects in the texture view component. In MVC+D, the depth view component and the texture view component are separately decodable. For example, video decoder 30 may implement two instances of an MVC codec, in which a first codec decodes the texture view components and a second codec decodes the depth view components. These two codecs can execute independent of one another because the texture view components and the depth view components are separately encoded.

In MVC+D, a depth view component is always immediately following the associated (e.g., corresponding) texture view component. In this manner, MVC+D supports texture-first coding, where the texture view component is decoded prior to the depth view component.

A texture view component and its associated (e.g., corresponding) depth view component may include the same picture order count (POC) value and view_id (i.e., the POC value and view_id of a texture view component and its associated depth view component is the same). The POC value indicates the display order of the texture view component and the view_id indicates the view to which the texture view component and depth view component belong.

Figure 2:
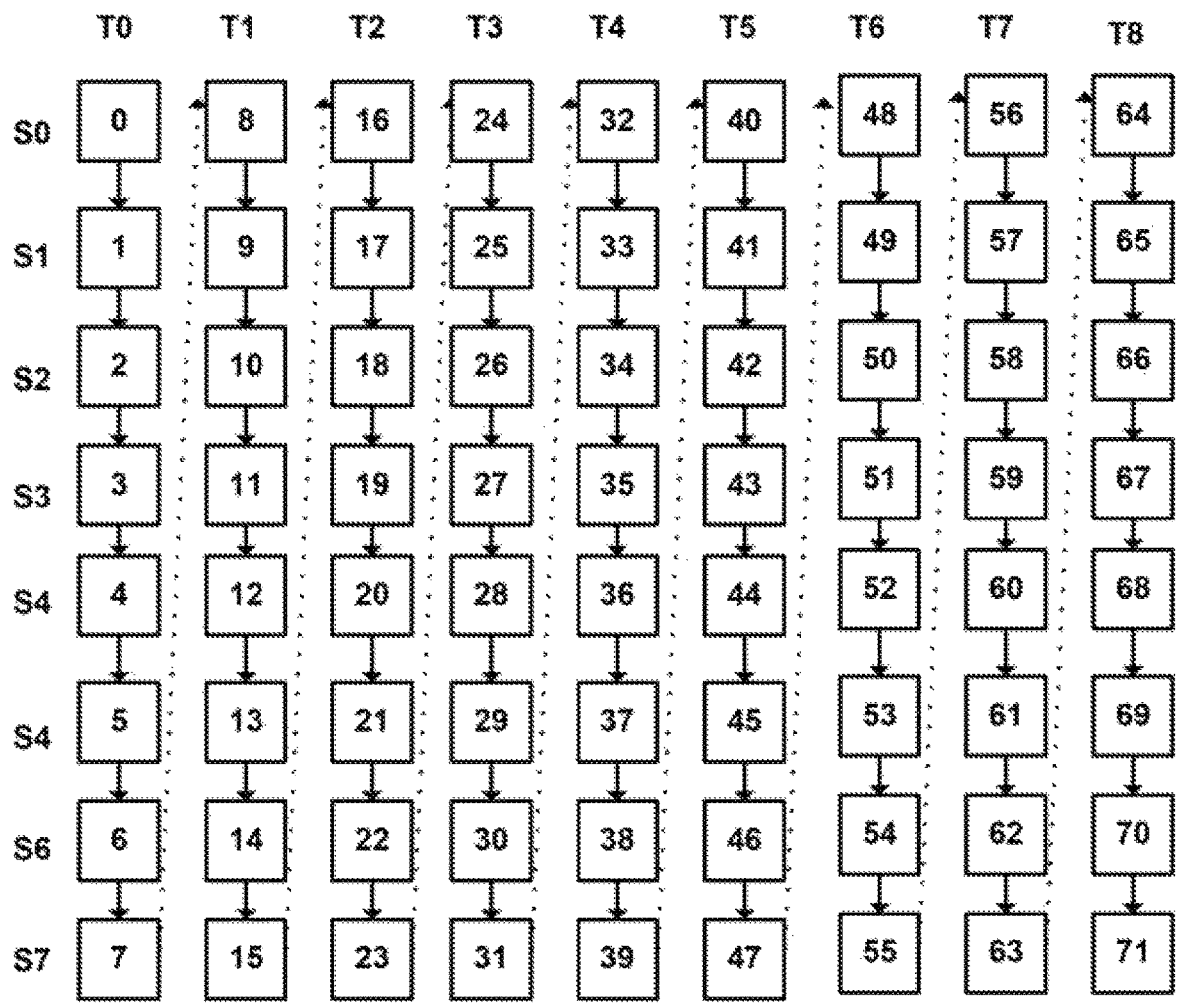
FIG. 2 is a conceptual diagram illustrating an example multiview decoding order.

FIG. 2 shows a typical MVC decoding order (i.e. bitstream order). The decoding order arrangement is referred as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component may include a texture view component and a depth view component.

texture view component: A coded representation of the texture of a view in a single access unit.

depth view component: A coded representation of the depth of a view in a single access unit.

As discussed above, in the context of this disclosure, the view component, texture view component, and depth vide component may be generally referred to as a layer. In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example analogy, the depth view component is like a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose. The above explanation is intended to be an analogy for purposes of relating depth images to texture images. The depth values in a depth image do not in fact represent shades of gray, but in fact, represent 8-bit, or other bit size, depth values.

The depth view component using only luma values (e.g., intensity values) to identify depth is provided for illustration purposes and should not be considered limiting. In other examples, any technique may be utilized to indicate relative depths of the pixels in the texture view component.

Figure 3:
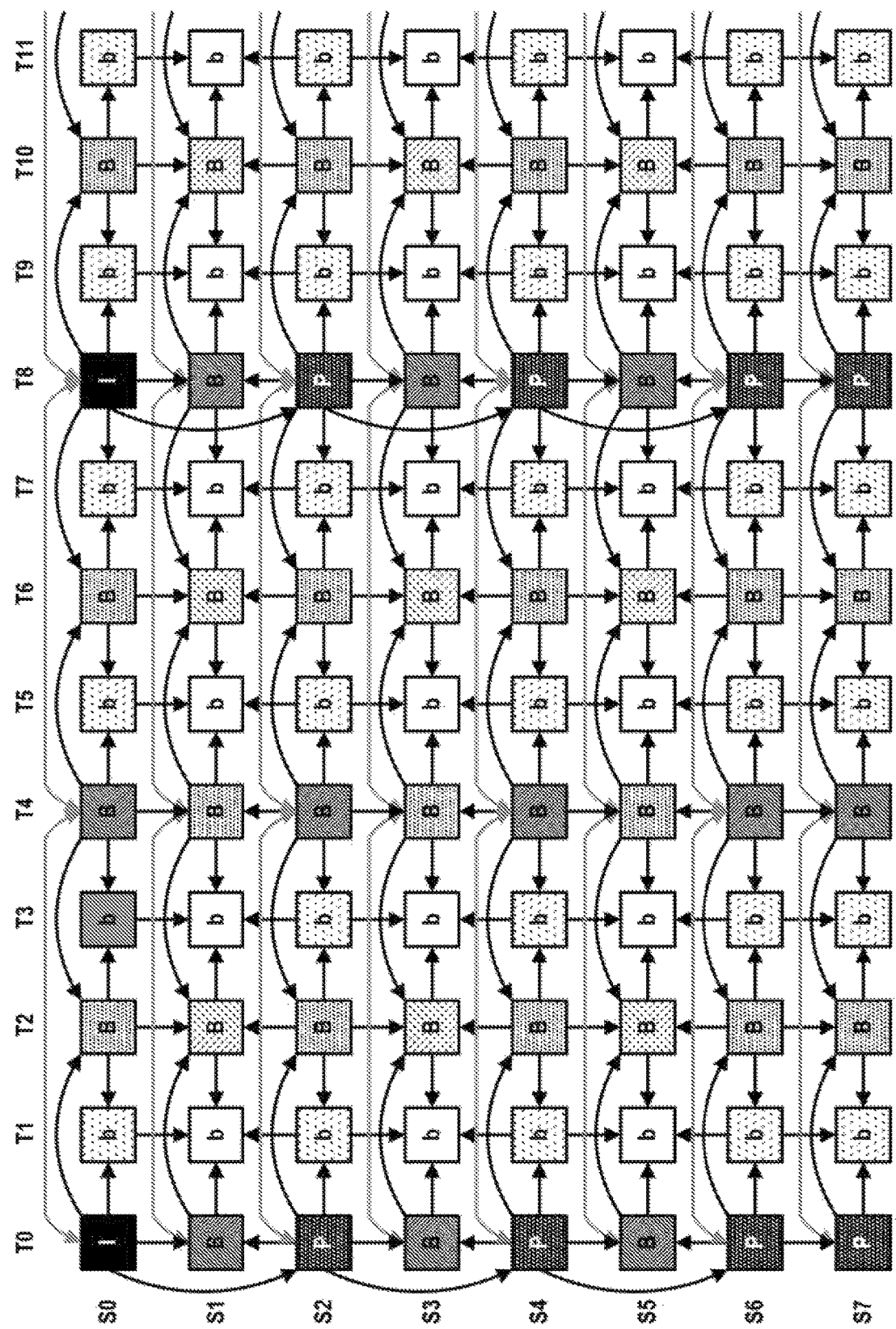
FIG. 3 is a conceptual diagram illustrating an example prediction structure for multiview coding.

FIG. 3 shows a typical MVC prediction structure (including both inter-picture prediction within each view and inter-view prediction between views) for multi-view video coding. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs may also be supported by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views may also be supported by MVC. One of the advantages of MVC is that an MVC encoder may take more than two views as a 3D video input and an MVC decoder may decode such a multiview representation. As such, any renderer with an MVC decoder may decode 3D video content with more than two views.

As discussed above, in MVC, inter-view prediction is allowed among pictures in the same access unit (meaning, in some instances, with the same time instance). When coding a picture in one of the non-base views, a picture may be added into a reference picture list, if it is in a different view but within a same time instance. An inter-view prediction reference picture may be put in any position of a reference picture list, just like any inter-prediction reference picture. As shown in FIG. 3, a view component can use the view components in other views for reference. In MVC, inter-view prediction is realized as if the view component in another view was an inter-prediction reference.

In MVC, inter-view prediction is allowed among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

As shown in FIG. 3, a view component can use the view components in other views for reference. This is called inter-view prediction. In MVC, inter-view prediction is realized as if the view component in another view was an inter prediction reference.

In the context of multiview video coding, there are at least two different types of motion vectors. One type of motion vector is a normal motion vector (which may be referred to as a temporal motion vector) pointing to temporal reference pictures. The corresponding temporal inter prediction is motion-compensated prediction (MCP). The other type of motion vector is a disparity motion vector pointing to pictures in a different view (i.e., inter-view reference pictures). The corresponding inter prediction is disparity-compensated prediction (DCP).

Video decoder 30 may decode video using multiple HEVC inter coding modes. In HEVC standard, there are two inter prediction modes, named merge mode (skip mode generally being considered as a special case of merge) and AMVP) mode respectively for a PU. In either AMVP or merge mode, video decoder 30 maintains a motion vector candidate list for multiple motion vector predictors. The motion vector(s), as well as reference indices in the merge mode, of the current PU may be generated by taking one candidate from the candidate list.

The candidate list contains, for example in HEVC, up to five candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the candidate list since the AMVP candidate contains only a motion vector. In AMVP mode, motion vector difference between selected motion vector and motion vector predictor corresponding to the MVP index is further signaled. As can be seen above, a merge candidate corresponds to a full set of motion information while an AMVP candidate contains just one motion vector for a specific prediction direction and reference index.

As described above, video decoder 30 may decode video that was coded according to the HEVC-based 3D video coding standard. Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and the standardization of the 3D video codec based on HEVC (3D-HEVC). For 3D-HEVC, new coding tools, including tools for CU/PU level coding, for both texture and depth views may be included and supported. The latest software 3D-HTM for 3D-HEVC can be, 13 Jun. 2014, downloaded from the following link: [3D-HTM version 9.0r1]: https://hevc.hhi.fraunhofer.de/svn/svn_3DVCSoftware/tags/HTM-9.0r1/.

The latest reference software description is available as follows: Li Zhang, Gerhard Tech, Krzysztof Wegner, Sehoon Yea, "Test Model 6 of 3D-HEVC and MV-HEVC," JCT3V-F1005, Joint Collaborative Team on 3D Video Coding Extension Development of ITU-T SG 16 WP 3 and IS0/IEC JTC 1/SC 29/WG 11, 6th Meeting: Geneva, CH, November 2013. It may be downloaded, as of 13 Jun. 2014, from the following link: http://phenix.it-sudparis.eu/jct2/doc_end_user/current_document.php?id=1636.

The latest working draft of 3D-HEVC is available as follows: Gerhard Tech, Krzysztof Wegner, Ying Chen, Sehoon Yea, "3D-HEVC Draft Text 2," JCT3V-F1001, Joint Collaborative Team on 3D Video Coding Extension Development of ITU-T SG 16 WP 3 and IS0/IEC JTC 1/SC 29/WG 11, 6th Meeting: Geneva, CH, November 2013. It could be downloaded from the following link: http://phenix.it-sudparis.eu/jct2/doc_end_user/documents/6_Geneva/wg11/JCT3V-F1001-v4.zip Video decoder 30 may be configured to implement various disparity vector derivation processes. An example of one such process is called Neighboring Blocks based Disparity Vector (NBDV), which is used in current 3D-HTM. NBDV utilizes disparity motion vectors from spatial and temporal neighboring blocks. In NBDV, video decoder 30 checks the motion vectors of spatial or temporal neighboring blocks in a fixed checking order. Once video decoder 30 identifies a disparity motion vector or an implicit disparity vector (IDV), video decoder 30 terminates the checking process. When performing NBDV, video decoder 30 returns the identified disparity motion vector and converts it to the disparity vector. Video decoder 30 may use this determined disparity vector for inter-view motion prediction and/or inter-view residual prediction. If no such disparity vector is found after checking all the pre-defined neighboring blocks, video decoder 30 may use a zero disparity vector for inter-view motion prediction and disable inter-view residual prediction for the corresponding PU.

3D-HEVC first adopted a form of NBDV in JCT3V-A0097: 3D-CE5.h: Disparity vector generation results, L. Zhang, Y. Chen, M. Karczewicz (Qualcomm). IDVs were included with a simplified NBDV in JCT3V-A0126: 3D-CE5.h: Simplification of disparity vector derivation for HEVC-based 3D video coding, J. Sung, M. Koo, S. Yea (LG). On top of that, NBDV was further simplified by removing the IDVs stored in the decoded picture buffer, and a coding gain associated with RAP picture selection was improved in JCT3V-B0047: 3D-CE5.h related: Improvements for disparity vector derivation, J. Kang, Y. Chen, L. Zhang, M. Karczewicz (Qualcomm). Further refinements to NBDV were described in JCT3V-D0181: CE2: CU-based Disparity Vector Derivation in 3D-HEVC, J. Kang, Y. Chen, L. Zhang, M. Karczewicz (Qualcomm).

Figure 4:
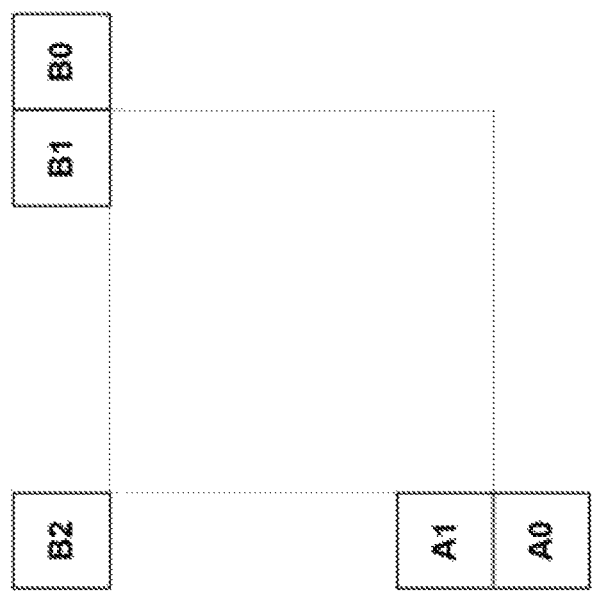
FIG. 4 shows spatial motion vector neighbors relative to a coding unit.

FIG. 4 is a conceptual diagram illustrating temporal neighboring blocks for NBDV. As introduced above, when implementing NBDV, video decoder 30 may check spatial and temporal neighboring blocks using a specified checking order. In some implementations of NBDV, video decoder 30 uses two spatial neighboring blocks for the disparity vector derivation. Those two blocks are the left and above neighboring blocks of the current PU, denoted by $A_1$ and $B_1$, as defined in FIG. 8-3 of the HEVC specification, which is reproduced as FIG. 4. Video decoder 30 may check up to two reference pictures from the current view (e.g. the co-located picture and the random-access picture or the reference picture with the smallest POC difference and smallest temporal ID) for temporal block checks. In one example, video decoder 30 may first check the random-access picture, followed by the co-located picture. For each candidate picture, video decoder 30 checks the center block, which corresponds to the center 4×4 block of the co-located region of the current PU.

In some implementations of NBDV, five spatial neighboring blocks are used for disparity vector derivation. The five spatial neighbors are the below-left, left, above-right, above and above-left blocks of the coding unit (CU) covering current prediction unit (PU), as denoted by A0, A1, B0, B1 or B2, as shown in FIG. 4. It should be noted that these spatial neighbors are the same spatial neighbors used in the MERGE/AMVP modes in HEVC. Therefore, no additional memory access is required.

For checking temporal neighbouring blocks, video decoder first performs a construction process of a candidate picture list. Video decoder 30 may treat up to two reference pictures from a current view as candidate pictures. Co-located reference picture is first inserted to the candidate picture list, followed by the rest of candidate pictures in the ascending order of reference index. When the reference pictures with the same reference index in both reference picture lists are available, the one in the same reference picture list of the co-located picture precedes the other one. For each candidate picture in the candidate picture list, three candidate regions are determined for deriving the temporal neighbouring blocks.

When a block is coded with inter-view motion prediction, a disparity vector needs to be derived for selecting a corresponding block in a different view. An implicit disparity vector (IDV or a.k.a. derived disparity vector) is referred as to the disparity vector derived in the inter-view motion prediction. Even though the block is coded with motion prediction, the derived disparity vector is not discarded for the purpose of coding a following block.

In the current design of 3D-HTM 7.0 and later versions of 3D-HTM, as part of NBDV, video decoder 30 checks, in a pre-defined order, disparity motion vectors in the temporal neighboring blocks, disparity motion vectors in the spatial neighboring blocks, and then the IDVs. Once, the disparity motion vector or IDV is found, video decoder 30 terminates the NBDV process. In some implementations of NBDV, the number of spatial neighboring blocks checked by video decoder 30 may be reduced to two.

Figure 7:
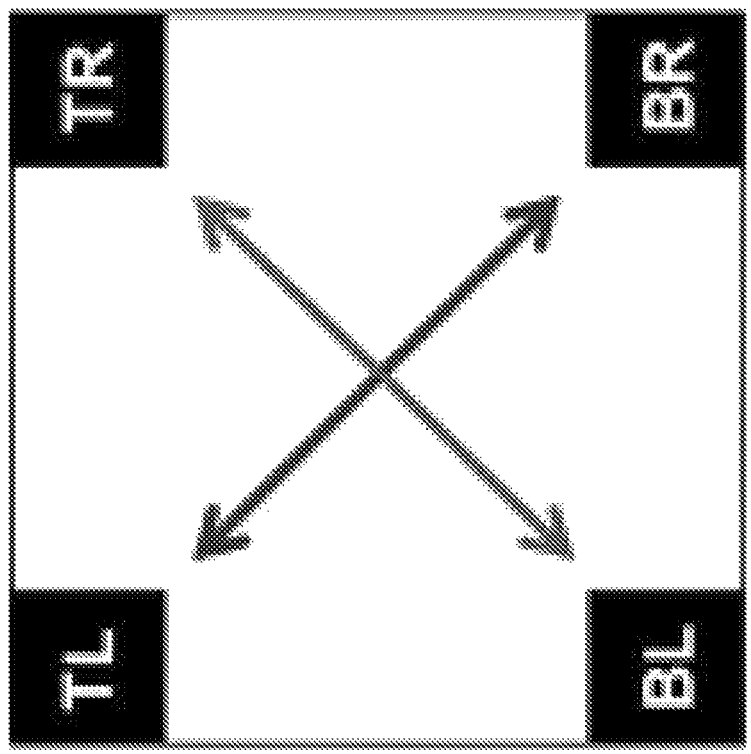
FIG. 7 shows four corner pixels of one 8×8 depth block

Video decoder 30 may also refine the determined disparity vector, in some examples. For example, video decoder 30 may refine the disparity vector generated using NBDV using the information in a coded depth map. That is, video decoder 30 may enhance the accuracy of the disparity vector by using the information coded in the base view depth map. As part of the refinement process, video decoder 30 may first locate a corresponding depth block by the derived disparity vector in the previously coded reference depth view, such as the base view. The size of the corresponding depth block may be the same as that of current PU. Video decoder 30 may then calculate a disparity vector from the collocated depth block, e.g. from the maximum value of the four corner depth values, as shown, for example, in FIG. 7. The four corner samples correspond to a top-left (TL) sample, a top-right (TR) sample, a bottom-left (BL) sample, and a bottom-right (BR) sample. Video decoder 30 may set the horizontal component of the disparity vector to this calculated value, while the vertical component of the disparity vector is set to 0.

When one disparity vector is derived from the NBDV process, video decoder 30 may further refine the disparity vector by retrieving the depth data from reference view's depth map. This depth-based refinement process is referred to as Do-NBDV. The refinement process may, for example, include two steps. First, video decoder 30 may locate a corresponding depth block using the derived disparity vector (i.e. the disparity vector derived using NBDV) in the previously coded reference depth view, such as the base view. The size of the corresponding depth block may be the same as that of the current PU. Second, video decoder 30 may select one depth value from four corner pixels of the corresponding depth block and convert the selected depth value to the horizontal component of the refined disparity vector. The vertical component of the disparity vector may be unchanged by video decoder 30.

In some examples, video decoder 30 may use the refined disparity vector for inter-view motion prediction while using the unrefined disparity vector for inter-view residual prediction. Additionally, video decoder 30 may store the refined disparity vector as the motion vector of one PU if it is coded with backward view synthesis prediction mode. In the current design of 3D-HEVC, the depth view component of the base view is always accessed regardless of the value of the view order index derived from the NBDV process.

Figure 5:
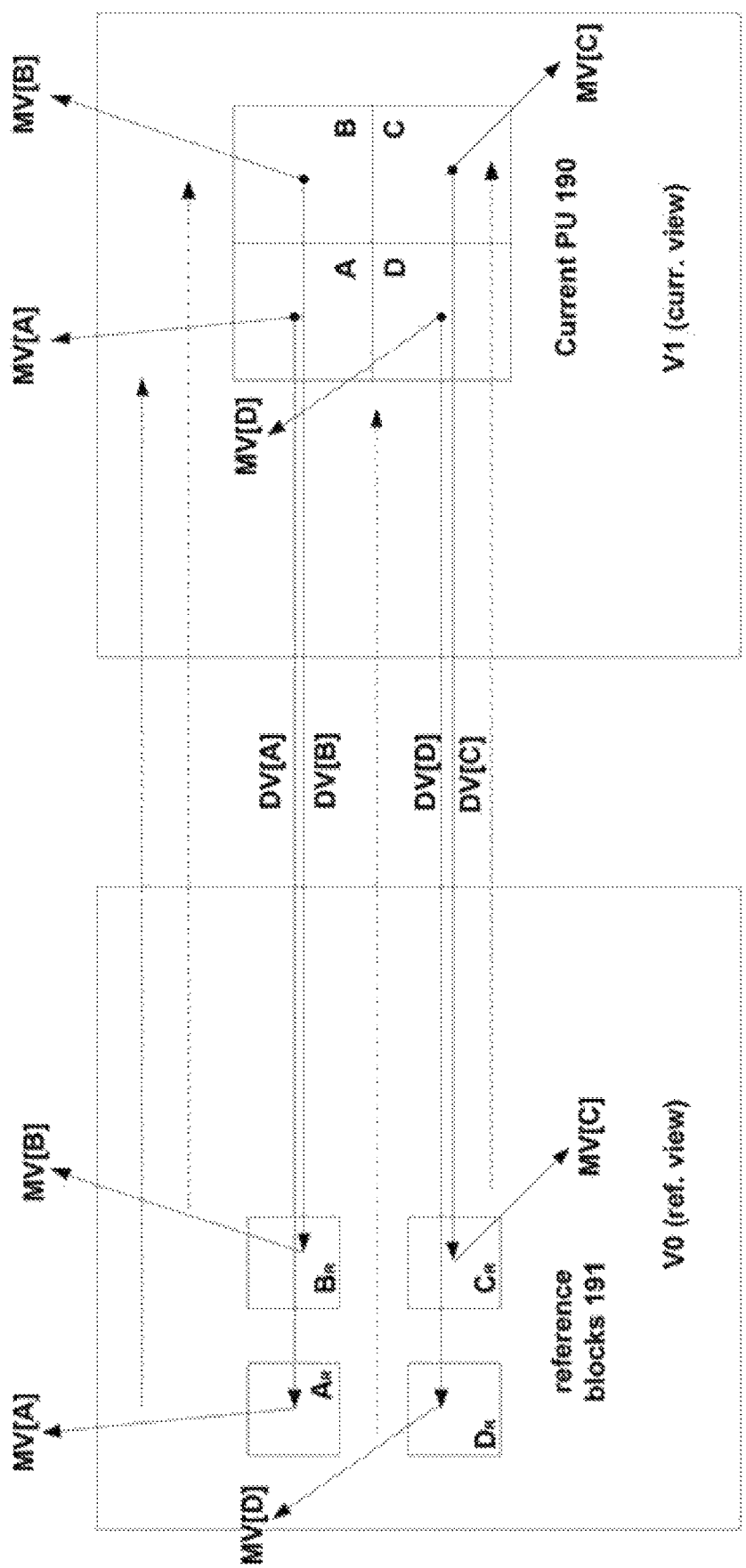
FIG. 5 shows an example prediction structure for sub-PU level inter-view motion prediction.

FIG. 5 shows an example of sub-PU level inter-view motion prediction. FIG. 5 shows a current view, referred to as V1, and a reference view, referred to as V0. Current PU 190 includes four sub-PUs A-D. Video decoder 30 may use disparity vectors of each of the four sub-PUs A-D to locate reference blocks 191, which includes four reference blocks $A_R$-$D_R$. The disparity vectors of sub-PUs A-D are shown in FIG. 5 as DV[i], where i corresponds to A-D. As each of the four sub-PUs has a unique disparity vector, the location of sub-PUs A-D relative to one another may differ than the location of reference blocks $A_R$-$D_R$ relative to one another. In sub-PU level interview motion prediction, video decoder 30 may use the motion vector of a reference block to predict a sub-PU. The motion vectors of reference blocks $A_R$-$D_R$ are shown in FIG. 5 as MV[i], where i corresponds to A-D. Thus, as one example, for sub-PU A, video decoder 30 may use DV[A] to locate reference block $A_R$, determine reference block $A_R$ was coded using MV[A], and use MV[A] to locate a predictive block for sub-PU A.

Video decoder 30 may be configured to perform sub-PU level inter-view motion prediction as introduced above with respect to FIG. 5. Aspects of inter-view motion prediction are described above, where only the motion information of the reference block is used for the current PU in the dependent view. However, the current PU may correspond to a reference area (with the same size as current PU identified by the disparity vector) in the reference view and the reference are may have plentiful motion information. Sub-PU level inter-view motion prediction (SPIVMP) as shown in FIG. 5 can use plentiful motion information in the reference area. SPIVMP may only apply for partition mode 2N×2N.

In JCT3V-F0110, a sub-PU level inter-view motion prediction method is proposed to generate a new merge candidate. The new candidate is added to the motion vector candidate list. The new candidate, called a sub-PU merge candidate, may be derived by the following method. Denote the size of a current PU as nPSW×nPSH, the signaled sub-PU size by N×N, and the final sub-PU size by subW× subH.

First, divide the current PU into one or multiple sub-PUs depending on the PU size and signaled sub-PU size.

sub$W$=max($N$,$nPSW$)!=$N$?$N$:$nPSW$;

sub$H$=max($N$,$nPSH$)!=$N$?$N$:$nPSH$;

Second, set default motion vector tmvLX to (0, 0) and reference index refLX to −1 for each reference picture list (with X being 0 and 1). For each sub-PU in the raster scan order, the following applies:

add the DV from Do-NBDV or NBDV process to the middle position of current sub-PU to obtain a reference sample location (xRefSub, yRefSub) by:

$x$RefSub=Clip3(0,PicWidthInSamples$L$−1,$xP$Sub+ $nPSW$sub/2+((mvDisp[0]+2)>>2))

$y$RefSub=Clip3(0,PicHeightInSamples$L$−1,$yP$Sub+ $nPSH$Sub/2+((mvDisp[1]+2)>>2))

a block in the reference view that covers (xRefSub, yRefSub) is used as the reference block for current sub-PU.

For the identified reference block,
if it is coded using temporal motion vectors, the following apply:
The associated motion parameters can be used as candidate motion parameters for the current sub-PU.
tmvLX and refLX are updated to the motion information of the current sub-PU.
If current sub-PU is not the first one in the raster scan order, the motion information (tmvLX and refLX) is inherited by all the previous sub-PUs.
Otherwise (the reference block is intra coded), the motion information of current sub-PU is set to tmvLX and refLX.

A different sub-PU block size such as, 4×4, 8×8, and 16×16, may be used. The size of sub-PU block may be present in a view parameter set.

Video decoder 30 may also add 3D-HEVC merge candidates to the motion vector candidate list. 3D-HEVC merge candidates generally refer to candidates that are not used in the merge mode of the base HEVC specification but are used in the 3D-HEVC specification. As part of adding 3D-HEVC merge candidates, video decoder 30 may generate an additional candidate derived from a shifted DV and/or DMV. Video decoder 30 may, for example, generate an additional candidate by following two steps. First, video decoder 30 may shift the disparity vector (DV) by ((PuWidth/2*4+4), (PuHeight/2*4+4)) and uses the shifted DV to derive an IPMC candidate in the reference view. Here, the size of the current PU is PuWidth×PuHeight.

Second, if the IPMC is unavailable from the step above step, video decoder 30 may derive a candidate, denoted as a Disparity Shifted Motion Vector (DSMV) and set the DSMV to be the additional candidate. Video decoder 30 may derive the DSMV as follows:

Video decoder 30 identifies the first available disparity motion vector (DMV) corresponding to the RefPicList0 from the spatial neighboring blocks $A_1$, $B_1$, $B_0$, $A_0$ or $B_2$.

If the DMV is available (that is denoted as 'mv')
  i. DSMV[0]=mv[0], DSMV[1]=mv[1] and DSMV[0][0]+=4, reference indices are inherited from the first available candidate (which contains the DMV).
  ii. When BVSP is enabled, DSMV[0][1] is set to 0.
mv represents the first identified DMV in the above step, which can include motion vectors of both prediction direction 0 (denoted by mv[0]) and prediction direction 1 (denoted by mv[1]). DSMV[i] and mv[i] refer to the motion vector of prediction direction i respectively, where i=0 or 1. mv[i][0] and mv[i][1] refer to the horizontal and vertical component of mv[i] respectively. DSMV[i][0] and DSMV[i][1] refers to the horizontal and vertical component of DSMV[i] respectively.

Otherwise, DSMV[0][0]=DV[0]+4, DSMV[1][0]=DV[0]+4; DSMV[0][1]=0 and DSMV[1][1]=0. Here DV is the disparity vector.

A description of the whole merge list generation process, which may be performed by video decoder 30, will now be discussed. The order of the steps shown below represents one potential order. It is contemplated that video decoder 30 may also generate a merge candidate list by performing the steps in a different order, performing a subset of the steps, or including new sets.

1. Video decoder 30 derives a disparity vector and identifies the corresponding block of the current PU based on the disparity vector. An IPMC, if derived to be available, is added to the motion vector candidate list.

The Inter-view Predicted Motion Candidate (IPMC) derived from the corresponding block, if available, is added. Note that IPMC is typically a candidate containing motion vectors referring to temporal reference pictures. IPMC may be extended to "Sub-PU level inter-view motion prediction" candidate as described in above with respect to FIG. 5.

2. Video decoder 30 adds spatial merge candidates (SMCs) $A_1$, $B_1$ and $B_0$ to the motion vector candidate list.
   a. In addition, during SMC generation process, if a SMC derived from $A_1$ or $B_1$ is the same as the IPMC in step 1 they are excluded from the motion vector candidate list.
3. Video decoder 30 converts the disparity vector into a disparity motion vector and adds the disparity motion vector to the motion vector candidate list, if they are different from the $A_1$ and $B_1$.
4. Video decoder 30 inserts the BVSP merge candidate into the motion vector candidate list, if BVSP is enabled for current slice.
5. Video decoder 30 adds SMC $A_0$ and $B_2$ to the motion vector candidate list.
6. If IPMC was derived to be the additional candidate, video decoder 30 compares it with the IPMC in step 1. If it is not equal to the IPMC in step 1 or if the additional candidate is a DSMV candidate (when the additional IPMC is unavailable), video decoder 30 inserts the generated additional candidate into the motion vector candidate list.
7. Video decoder 30 adds a temporal merge candidate to the motion vector candidate list as the current design.
8. Video decoder 30 may other motion vector candidates to the motion vector candidate list if the number of valid candidates is less than the maximum number.

It should be noted that the candidate list size is not changed (still six), once there are enough candidates in the candidate list, no more candidates will be further added.

Figure 6:
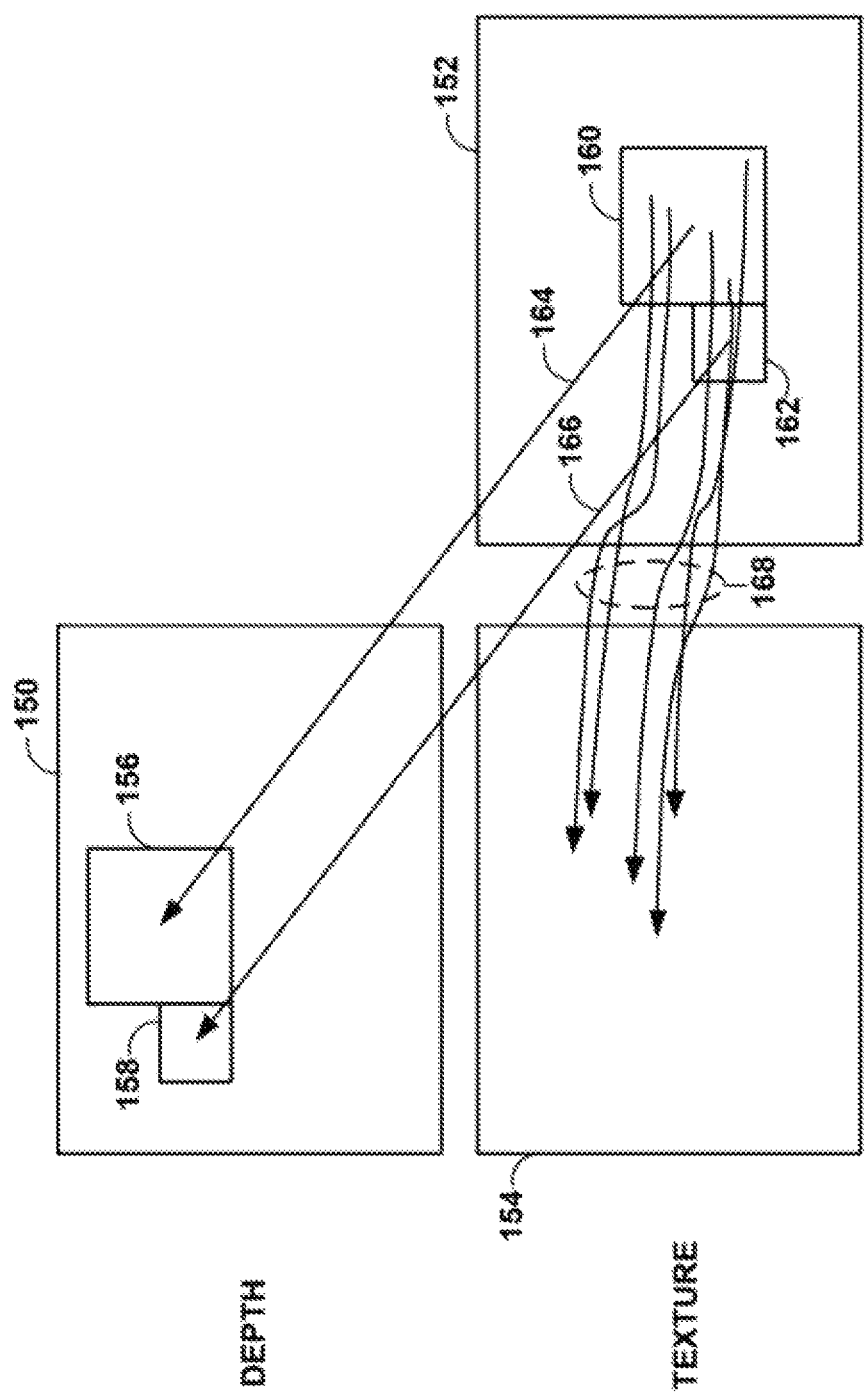
FIG. 6 is a conceptual diagram illustrating techniques related to backward view synthesis prediction (BVSP) using neighboring blocks.

FIG. 6 is a conceptual diagram illustrating techniques related to backward view synthesis prediction (BVSP) using neighboring blocks. BVSP has been proposed, and adopted, as a technique for 3D-HEVC. The backward-warping VSP approach as proposed in JCT3V-O0152 was adopted in the 3rd JCT-3V meeting. The basic idea of this backward-warping VSP is the same as the block-based VSP in 3D-AVC. Both of these two techniques use the backward-warping and block-based VSP to avoid transmitting the motion vector differences and use more precise motion vectors. Implementation details are different due to different platforms. This disclosure generally uses the initialism BVSP to refer to backward view synthesis prediction in 3D-HEVC, although BVSP may also refer to block-based view synthesis prediction of 3D-AVC.

In 3D-HTM, texture first coding is applied in common test conditions. Therefore, the corresponding non-base depth view is unavailable when decoding one non-base texture view. Therefore, the depth information is estimated and used to perform BVSP. In order to estimate the depth information for a block, it was proposed to first derive a disparity vector from the neighboring blocks, and then use the derived disparity vector to obtain a depth block from a reference view.

As already introduced above, in the HTM 5.1 test model, there exists a process to derive a disparity vector predictor, known as NBDV. Let (dvx, dvy) denote the disparity vector identified from the NBDV function, and the current block position is (blockx, blocky). It was proposed to fetch a depth block at (blockx+dvx, blocky+dvy) in the depth image of the reference view. The fetched depth block would have the same size of the current prediction unit (PU), and it would then be used to do backward warping for the current PU. FIG. 6 illustrates the steps for locating a depth block from the reference view and then using the depth block for BVSP prediction.

In the example of FIG. 6, depth picture 150 and texture picture 154 correspond to the same view, while texture picture 152 corresponds to a different view. In particular, texture picture 152 includes current block 160 being coded relative to texture picture 154, acting as a reference picture. A video coder may refer to neighboring block 162, which neighbors current block 160. Neighboring block 162 includes a previously determined disparity vector 166. Disparity vector 166 may be derived as a disparity vector 164 for current block 160. Thus, disparity vector 164 refers to depth block 156 in depth picture 150 of the reference view.

The video coder may then use pixels (that is, depth values) of depth block 156 to determine disparity values 168 for pixels (that is, texture values) of current block 160, for performing backward warping. The video coder may then synthesize values for a predicted block (i.e., a BVSP reference block) for current block 160 from the pixels identified by disparity values 168. The video coder may then predict current block 160 using this predicted block. For instance, during video encoding by video encoder 20, video encoder 20 may calculate pixel-by-pixel differences between the predicted block and current block 160 to produce a residual value, which video encoder 20 may then transform, quantize, and entropy encode. On the other hand, during video decoding by video decoder 30, video decoder 30 may entropy decode, inverse quantize, and inverse transform residual data, then combine the residual data (on a pixel-by-pixel basis) with the predicted block to reproduce current block 160.

The backward-warping VSP approach as proposed in JCT3V-00152 was adopted in the 3rd JCT-3V meeting. The basic idea of this backward-warping VSP is the same as the block-based VSP in 3D-AVC. Both of these two techniques use the backward-warping and block-based VSP to avoid transmitting the motion vector differences and use more precise motion vectors. Implementation details are different due to different platforms.

In the following paragraphs, this disclosure may also use the term BVSP to indicate the backward-warping VSP approach in 3D-HEVC. The signaling of BVSP Mode will now be discussed.

In some version of 3D-HTM, the BVSP mode is only supported for an inter-code block in either skip or merge mode. BVSP mode is not allowed for a block coded in AMVP mode. Instead of transmitting a flag to indicate the usage of BVSP mode, one additional merge candidate (i.e., BVSP merge candidate) is introduced and each candidate is associated with one BVSP flag. When the decoded merge index corresponds to a BVSP merge candidate, it indicates that current prediction unit (PU) uses the BVSP mode and for each sub-block within current PU, its own disparity motion vector may be derived by converting a depth value in a depth reference view.

The setting of BVSP flags is defined as follows:
When a spatial neighboring block used for deriving a spatial merge candidate is coded with BVSP mode, the associated motion information is inherited by current block as conventional merging mode. In addition, this spatial merge candidate is tagged with a BVSP flag equal to 1.

For the newly introduced BVSP merge candidate, the BVSP flag is set to 1.
For all the other merge candidates, the associated BVSP flags are set to 0.

Video decoder 30 may be configured to generate a BVSP merge candidate. In 3D-HEVC, a new candidate, called a BVSP merge candidate is derived and inserted to the merge candidate list. The corresponding reference picture indices and motion vectors are set by the following method:

Obtain the view index denoted by refVIdxLX of the derived disparity vector from NBDV;
Obtain the reference picture list RefPicListX (either RefPicList0 or RefPicList1) that is associated with the reference picture with the view order index equal to refVIdxLX. The corresponding reference picture index and the disparity vector from NBDV process are used as the motion information of the BVSP merge candidate in RefPicListX.
If current slice is a B slice, check the availability of an interview reference picture with view order index denoted by refVIdxLY unequal to refVIdxLX in the reference picture list other than RefPicListX, i.e., RefPicListY with Y being 1−X;
If such a different interview reference picture is found, bi-predictive VSP is applied. Meanwhile, the corresponding reference picture index of the different interview reference picture and the scaled disparity vector from NBDV process are used as the motion information of the BVSP merge candidate in RefPicListY. The depth block from the view with view order index equal to refVIdxLX is used as the current block's depth information (in case of texture-first coding order), and the two different interview reference pictures (each from one reference picture list) are accessed via backward warping process and further weighted to achieve the final backward VSP predictor;
Otherwise, uni-predictive VSP is applied with RefPicListX as the reference picture list for prediction.

As introduced above, video decoder 30 may be configured to perform motion compensation. In 3D-HTM, texture first coding is applied in common test conditions. Therefore, the corresponding non-base depth view is unavailable when decoding one non-base texture view. Therefore, the depth information is estimated and used to perform BVSP.

In order to estimate the depth information for a block, it is proposed that video decoder 30 may first derive a disparity vector from the neighboring blocks, and then use the derived disparity vector to obtain a depth block from a reference view.

In the HTM 8.0 test model, there exists a process to derive a disparity vector predictor, known as NBDV (described above). Let $(dv_x, dv_y)$ denote the disparity vector identified from the NBDV function and $(block_x, block_y)$ denote the current block position.

Video decoder 30 may perform uni-predictive BVSP. For example, according to one proposal, video decoder 30 may fetch a depth block with the top-left position $(block_x+dv_x, block_y+dv_y)$ in the depth image of the reference view. The current block is firstly split into several sub-blocks with the same size equal to W*H. For each sub-block with the size equal to W*H, a corresponding depth sub-block within the fetched depth block is utilized and the maximum depth value from the four corner pixels of the depth sub-block is converted to a disparity motion vector. The derived disparity motion vector for each sub-block is then used for motion compensation. FIG. 6 illustrates the three steps on how a depth block from the reference view is located and then used for BVSP prediction.

Video decoder 30 may also perform bi-predictive BVSP. When there are multiple interview reference pictures from different views in RefPicList0 and RefPicList1, video decoder 30 may apply bi-predictive VSP. That is, the two VSP predictors will be generated from each reference list, as described above. Video decoder 30 may then average the two VSP predictors to obtain the final VSP predictor.

The motion compensation size, i.e., W*H as described above could be either 8×4 or 4×8. To determine the motion compensation size, video decoder 30 may apply the following:
For each 8×8 block, 4 corners of corresponding depth 8×8 block are checked and:

if (vdepth[TL]<vdepth[BR]?0:1)!=(vdepth[TR]
   <vdepth[BL]!0:1)

use 4×8 partition($W=4, H=8$)

else use 8×4 partition($W=8, H=4$)

There may be several potential problems associated with existing 3D motion vector candidate list construction techniques. As one example, the generation of DSMV candidates requires checking all neighboring blocks, which potentially requires an undesirably high number of condition checks. HEVC merge candidates and the 3D-HEVC additional merge candidates require so much interaction.

In some examples, this disclosure introduces simplifications of the DSMV candidate derivation process for 3D-HEVC texture coding as well as the merge list construction for 3D-HEVC candidates.

According to one technique of this disclosure, the generation of the DSMV candidate can be simplified by searching only the first N candidates derived by the HEVC merge list construction process. N may, for example, be less than or equal to 2. In other examples, N may be 4, 1, 3 etc. According to the techniques of this disclosure, the information of spatial positions of the candidates in the HEVC merge list may not be needed. For instances, video decoder 30 may only check the first two candidates in the HEVC merge list, without checking whether those candidates are from $A_1$, $B_1$, $B_0$, $A_0$ or $B_2$. Existing techniques, in contrast, require that the position of the candidate, i.e. if the candidate comes from $A_1$, $B_1$, $B_0$, $A_0$ or $B_2$, and the video decoder checks these positions in order.

In these examples, the HEVC merge list may not include the virtual candidates. Alternatively, the HEVC merge list may include the virtual candidates.

According to the techniques of this disclosure, video decoder 30 may generate an additional candidate by following the steps described below.
1. Video decoder 30 may shift DV by ((PuWidth/2*4+4), (PuHeight/2*4+4)) and use the shifted DV to derive an IPMC candidate in the reference view. Here, the size of the current PU is PuWidth×PuHeight. DV may correspond to the disparity vector derived using Do-NBDV if depth refinement is enabled for current slice. Otherwise, DV may correspond to the disparity vector derived by NBDV.
2. If the IPMC is unavailable from the above step 1, video decoder 30 derives a DMSV candidate and sets it to be the additional candidate. Video decoder 30 may derive the DSMV candidate as follows:

Video decoder 30 identifies the first available disparity motion vector (DMV) corresponding to the RefPicList0 from the first two candidates in the merge list created by the merge mode of the base HEVC specification.
   If the DMV is available (that is denoted as 'mv')
     i. DSMV[0]=mv[0], DSMV[1]=mv[1] and DSMV[0][0]+=4, reference indices are inherited from the first available candidate (which contains the DMV).
     ii. When BVSP is enabled, DSMV[0][1] is set to 0. Otherwise, DSMV[0][0]=DV[0]+4, DSMV[1][0]=DV[0]+4; DSMV[0][1]=0 and DSMV[1][1]=0. Here DV is the disparity vector.

Alternatively, it is proposed that generation of the DSMV candidate may be simplified by having video decoder 30 not search the spatial neighboring candidates, and instead, video decoder 30 may set the DSMV candidate directly to be the shifted disparity vector. Video decoder 30 may generate an additional candidate by following the steps described below.
1. Video decoder 30 may shift the DV by ((PuWidth/2*4+4), (PuHeight/2*4+4)) and use it to derive an IPMC candidate in the reference view. Here, the size of the current PU is PuWidth×PuHeight. DV may correspond to the disparity vector derived using Do-NBDV if depth refinement is enabled for current slice. Otherwise, DV may correspond to the disparity vector derived by NBDV.
2. If the IPMC is unavailable from the above step 1, video decoder 30 may derive a DSMV candidate and set the DSMV to be the additional candidate. Video decoder 30 may derive the DSMV candidate as follows: DSMV[0][0]=DV[0]+4, DSMV[1][0]=DV[0]+4; DSMV[0][1]=0 and DSMV[1][1]=0. Here DV is the disparity vector.

The additional candidate which may be DSMV is inserted at the after the other merge candidates but before the virtual candidates.

It is also proposed that the merge candidate list generation can be simplified by ignoring which spatial/temporal neighbor the HEVC merge candidate comes from when the additional 3D-HEVC candidates are inserted.
1. In one example, if a pruning is required between a 3D-HEVC merge candidate and an HEVC candidate, it always between the current (3D-HEVC) candidate and a candidate in a fixed position of HEVC candidate list.
2. After an HEVC candidate is to be pruned out, it is first marked as "unavailable" or "to be removed", but still kept in the candidate list, until all 3D-HEVC candidates are inserted. At that time, those "unavailable" candidates are removed and the remaining candidates are shifted to fill in the empty slots.
3. The BVSP candidate is inserted in a way that the variable indicating whether a spatial neighbor is BVSP or not doesn't need to be present, thus not stored.

According to another technique of this disclosure, video decoder 30 may generate additional merge candidates (e.g. 3D-HEVC merge candidates) for the motion vector candidate list in a manner that does not require checking the availability of any specific candidates (e.g. the spatial and temporal neighbor candidates) generated from the HEVC merge process. Thus, instead of pruning the 3D-HEVC merge candidates (e.g. IPMC candidates, BVSP candidates, and/or DMSV candidates) against specific spatial merge candidates, such as spatial merge candidates A1 and/or B1 in FIG. 4, video decoder 30 may prune the 3D-HEVC merge candidates by determining if the 3D-HEVC merge candidates are the same as any of the first N HEVC merge candidates, where N represents an integer number, such as 1, 2, or 3. In other words, instead of comparing the 3D-HEVC candidates to the candidates determined based on spatial neighbors A1 and B1, the 3D-HEVC candidates may be compared to the first N candidates in the motion vector candidate list, which may be any of the HEVC spatial candidates, HEVC temporal candidate, or HEVC virtual candidates. In some examples, video decoder 30 may not compare the 3D-HEVC candidates to the first N candidates but may still compare the 3D-HEVC candidates against fixed positions in the motion vector candidate list. Video decoder 30 may, for example, not compare the 3D-HEVC candidates against the first entry in the candidate list (e.g. index 0) but compare the 3D-HEVC candidates against the second and third entries in the candidate list (e.g. indexes 1 and 2).

It is also proposed that the merge candidate list generation for additional merge candidates can be done in a manner where video decoder 30 does not check whether the number of candidates in the temporary merge candidate list exceeds the limit, which may avoid additional checks caused by the number of HEVC candidates in the list exceeding the maximum number of candidates. For example, instead of pruning the list while the list is being constructed and terminating the list construction process once the list is full, video decoder 30 may mark duplicate candidates as to be removed. After all candidates are inserted into the list, video decoder 30 may remove the candidates marked as duplicates and remove excess candidates. In some implementations, video decoder 30 may remove excess candidates without marking and removing duplicates. If, for example, the maximum number of candidates to be included in a motion vector candidate list is six, with index values of zero to five, video decoder 30 may remove from the temporary candidate list any candidate with an index that is equal to or greater than six.

Description of the whole merge list generation process for a first example will now be described. In this example, video decoder 30 first identifies the spatial candidates, temporal merge candidate, and the virtual candidates as in the merge mode of the base HEVC specification. Video decoder 30 may insert a BVSP candidate into the merge candidate list prior to the DV candidate.

The variable maxMrgNum represents the maximum merge candidate number in 3D-HEVC. HEVC merge candidates refer to the merge candidates derived in the HEVC merge list generation process.

1. Video decoder 30 may invoke the HEVC merge list generation processes to generate maxMrgNum merge candidates:
   a. Video decoder 30 may add SMCs $A_1$, $B_1$ and $B_0$ to the merge candidate list.
   b. Video decoder 30 Spatial merge candidates (SMC) $A_0$ and $B_2$ are added to the merge candidate list.
   c. Temporal merge candidate is added to the merge candidate list as the current design. (Note that the TMVP candidate has been changed in 3D-HEVC).
   d. Virtual candidates are added to the merge candidate list as the current design in 3D-HEVC.
2. Video decoder 30 may derive a disparity vector and identify the corresponding block of the current PU based on the disparity vector. If an IPMC is derived to be available, video decoder 30 may add the IPMC to the beginning of the merge candidate list (e.g. in position $0^{th}$).
   a. Video decoder 30 may prune the motion vector candidate list with the IPMC and the first and second merge candidates already in the list. If one of the first and second merge candidates is equal to the IPMC, then video decoder 30 may mark it as unavailable.
      i. If both the first and the second HEVC merge candidates are equal to the IPMC, then video decoder 30 may mark only the first HEVC merge candidate as unavailable.
      ii. Alternatively, if both the first and the second HEVC merge candidates are equal to the IPMC, then video decoder 30 may mark both of them as unavailable.
   b. Video decoder 30 may shift the HEVC merge candidates in the list so that the IPMC is put at the first position, i.e., all HEVC merge candidates are shifted backwards by one position.
3. Video decoder 30 may inert the BVSP merge candidate into the merge candidate list at the third position of the list (index starts from 0), if BVSP is enabled for the current slice. Video decoder 30 may convert the disparity vector to generate the BVSP candidate. First, the disparity vector is used to identify a corresponding depth block of current PU in reference depth view. Then, for each sub-block (4×8 or 8×4 block) within the depth block, the maximum value of the four corner pixels is converted to a disparity motion vector and is used for the corresponding sub-block in current PU.
   a. Shifting of the other candidates following the BVSP merge candidate in the list applies so that the BVSP is put at the third position, i.e., HEVC merge candidates after the third position (including the HEVC merge candidate at the third position) are shifted backwards by one position.
4. Video decoder 30 may convert the disparity vector to a disparity motion vector and add the disparity motion vector to the merge candidate list at the fourth position (index starts from 0) of the list. This is called a DV candidate. The disparity vector that is converted may, for example, be a disparity vector that is determined using NBDV or Do-NBDV as described above.
   a. The DV candidate is pruned with the first and second HEVC merge candidate in the list (in position $1^{st}$ and $2^{nd}$). If one of them is available and is equal to the DV candidate, the DV candidate is marked as unavailable.
   b. Shifting of the HEVC merge candidates in the list applies so that the DV candidate is put at the fourth position, i.e., HEVC merge candidates after the fourth position (including the HEVC merge candidate at the fourth position) are shifted backwards by one position.
5. If additional candidate is the bottom-right IPMC, it is compared with the IPMC in step 1. If it is not equal to the IPMC in step 1 or if the additional candidate is a DSMV (when the additional IPMC is unavailable), the generated additional candidate is inserted at the sixth position (index starts from 0) of the list.
   a. Alternatively, the additional candidate is inserted at the fifth position of the list.
   b. Shifting of the HEVC merge candidates in the list applies so that the additional candidate is put at the given position (the fifth or sixth position), i.e., HEVC merge candidates after the given position (including the HEVC merge candidate at the given position) are shifted backwards by one position.

6. Remove candidates that are marked as unavailable in the merge candidate list, and then truncate the list to make it includes only maxMrgNum candidates.

An example of working draft implementation for this example is provided below with a BVSP candidate inserted at the third position, a DV candidate inserted at the fourth position, and the additional candidate inserted at the sixth position. Deleted portions are marked with ~~strikethrough~~ and newly added portions are marked with doubleunderline.

I.8.5.3.2.1 Derivation Process for Luma Motion Vectors for Merge Mode

This process is only invoked when MergeFlag[ xPb ][ yPb ] is equal to 1, where ( xPb, yPb ) specify the top-left sample of the current luma prediction block relative to the top-left luma sample of the current picture.

Inputs to this process are:
- a luma location ( xCb, yCb ) of the top-left sample of the current luma coding block relative to the top-left luma sample of the current picture,

- a luma location ( xPb, yPb ) of the top-left sample of the current luma prediction block relative to the top-left luma sample of the current picture,
- a variable nCbS specifying the size of the current luma coding block,
- two variables nPbW and nPbH specifying the width and the height of the luma prediction block,
- a variable partIdx specifying the index of the current prediction unit within the current coding unit.

Outputs of this process are:
- the luma motion vectors mvL0 and mvL1,
- the reference indices refIdxL0 and refIdxL1,
- the prediction list utilization flags predFlagL0 and predFlagL1,
- the flag ivpMvFlag, specifying, whether the current PU is coded using inter-view motion prediction,
- the flag vspModeFlag, specifying, whether the current PU is coded using view synthesis prediction,
- the flag subPbMotionFlag, specifying, whether the motion data of the current PU has sub prediction block size motion accuracy,
- the flag dispDerivedDepthFlag, specifying, whether the current PU uses disparity derived depth,
- the variable dispDerivedDepthVal (when dispDerivedDepthFlag is equal to 1).

The function differentMotion( N, M ) is specified as follows:
- If one of the following conditions is true, differentMotion( N, M ) is equal to 1:
  - predFlagLXN != predFlagLXM (with X being replaced by 0 and 1),
  - mvLXN != mvLXM (with X being replaced by 0 and 1),
  - refIdxLXN != refIdxLXM (with X being replaced by 0 and 1),
- Otherwise, differentMotion( N, M ) is equal to 0.

The motion vectors mvL0 and mvL1, the reference indices refIdxL0 and refIdxL1, and the prediction utilization flags predFlagL0 and predFlagL1 are derived by the following ordered steps:

1. The derivation process for the base merge candidate list as specified in subclause I.8.5.3.2.18 is invoked with the luma location ( xCb, yCb ), the luma location ( xPb, yPb ), the variables nCbS, nPbW, nPbH, and the partition index partIdx as inputs, and the output being a modified luma location ( xPb, yPb ), the modified variables nPbW and nPbH, the modified variable partIdx, the luma location ( xOrigP, yOrigP ), the variables nOrigPbW and nOrigPbH, the merge candidate list baseMergeCandList, the luma motion vectors mvL0N and mvL1N, the reference indices refIdxL0N and refIdxL1N, and the prediction list utilization flags predFlagL0N and predFlagL1N, with N being replaced by all elements of baseMergeCandList.

2. For N being replaced by <u>0 to MaxNumMergeCand - 1, inclusive</u> <s>$A_1$, $B_1$, $B_0$, $A_0$ and $B_2$</s>, the following applies:
    - If N is an element in baseMergeCandList, availableFlag<u>b</u>N is set equal to 1.
    - Otherwise (N is not an element in baseMergeCandList), availableFlag<u>b</u>N is set equal to 0.

3. Depending on iv_mv_pred_flag[ nuh_layer_id ] and DispAvailabilityIdc[ xPb ][ yPb ], the following applies:
    - If iv_mv_pred_flag[ nuh_layer_id ] is equal to 0 or DispAvailabilityIdc[ xPb ][ yPb ] is not equal to DISP_NONE, the flags availableFlagIvMC, availableIvMCShift and availableFlagIvDC are set equal to 0.
    - Otherwise (iv_mv_pred_flag[ nuh_layer_id ] is equal to 1), the derivation process for the inter-view merge candidates as specified in subclause I.8.5.3.2.10 is invoked with the luma location ( xPb, yPb ), the variables nPbW and nPbH as inputs, and the output is assigned to the availability flags availableFlagIvMC, availableIvMCShift and availableFlagIvDC, the reference indices refIdxLXIvMC, refIdxLXIvMCShift and refIdxLXIvDC, the prediction list utilization flags predFlagLXIvMC, predFlagLXIvMCShift and predFlagLXIvDC, and the motion vectors mvLXIvMC, mvLXIvMCShift and mvLXIvDC (with X being 0 or 1, respectively).

4. Depending on view_synthesis_pred_flag[ nuh_layer_id ], DispAvailabilityIdc[ xPb ][ yPb ], and , dbbp_flag[ xPb ][ yPb ] the following applies:
    - If view_synthesis_pred_flag[ nuh_layer_id ] is equal to 0, DispAvailabilityIdc[ xPb ][ yPb ] is equal to DISP_NONE, or dbbp_flag[ xPb ][ yPb ] is equal to 1, the flag availableFlagVSP is set equal to 0.
    - Otherwise (view_synthesis_pred_flag[ nuh_layer_id ] is equal to 1, DispAvailabilityIdc[ xPb ][ yPb ] is not equal to DISP_NONE, and dbbp_flag[ xPb ][ yPb ] is equal to 0), the derivation process for a view synthesis prediction merge candidate as specified in subclause I.8.5.3.2.13 is invoked with the luma locations ( xPb, yPb ) and the variables nPbW and nPbH as inputs, and the outputs are the availability flag availableFlagVSP, the reference indices refIdxL0VSP and refIdxL1VSP, the prediction list utilization flags predFlagL0VSP and predFlagL1VSP, and the motion vectors mvL0VSP and mvL1VSP.

5. Depending on mpi_flag[ nuh_layer_id ], the following applies:
   - If mpi_flag[ nuh_layer_id ] is equal to 0, the variables availableFlagT and availableFlagD are set equal to 0.
   - Otherwise (mpi_flag[ nuh_layer_id ] is equal to 1), the following applies:
     - The derivation process for inter layer predicted sub prediction block motion vector candidates as specified in subclause I.8.5.3.2.16 is invoked with the luma location ( xPb, yPb ), the variables nPbW and nPbH, the variable refViewIdx being equal to −1, and the variable mvDisp being equal to ( 0, 0 ) as inputs, and the outputs are the prediction utilization flag predFlagLXT, the motion vector mvLXT and the reference indices refIdxLXT (with X being 0 or 1, respectively).
     - The flag availableFlagT is set equal to ( predFlagL0T || predFlagL1T ).
     - The derivation process for the disparity derived merge candidates as specified in subclause I.8.5.3.2.19 is invoked with the luma location ( xPb, yPb ), the variables nPbW and nPbH as inputs, and the outputs are the flag availableFlagD, the prediction utilization flag predFlagLXD, the reference index refIdxLXD, the motion vector mvLXD (with X being 0 or 1, respectively), and the variable dispDerivedDepthVal.

6. The variable availableFlagIvDCShift is set equal to 0, and when availableFlagIvMCShift is equal to 0, DepthFlag is equal to 0, and i is less than ( 5 + NumExtraMergeCand ), the derivation process for the shifted disparity merge candidate as specified in subclause I.8.5.3.2.15 is invoked with the luma location ( xPb, yPb ), the variables nPbW and nPbH, and the availability flags availableFlagN, the reference indices refIdxL0N and refIdxL1N, the prediction list utilization flags predFlagL0N and predFlagL1N, the motion vectors mvL0N and mvL1N, of every candidate N being in <u>baseMergeCandList</u> ~~extMergeCandList~~, <u>baseMergeCandList</u> ~~extMergeCandList~~, and i as inputs, and the outputs are the flag availableFlagIvDCShift, the prediction utilization flags predFlagL0IvDCShift and predFlagL1IvDCShift, the reference indices refIdxL0IvDCShift and refIdxL1IvDCShift, and the motion vectors mvL0IvDCShift and mvL1IvDCShift.

7. The merge candidate list, extMergeCandList, is constructed as follows:

<u>baseCanRemoval[ 0 ] = 1</u>
<u>baseCanRemoval[ 1 ] = 1</u>
i = 0
if( availableFlagT )
    extMergeCandList[ i++ ] = T
if( availableFlagD )
    extMergeCandList[ i++ ] = D
if( availableFlagIvMC &&
( !availableFlagT || differentMotion( T, IvMC ) ) )
    extMergeCandList[ i++ ] = IvMC
N = DepthFlag ? T : IvMC
if( ~~availableFlagA₁~~<u>availableFlagb0</u> &&
( !availableFlagN || differentMotion( N, <u>b0</u>~~A₁~~ ) ) )
    extMergeCandList[ i++ ] = <u>b0</u>~~A₁~~
<u>else</u>
    <u>baseCanRemoval[ 0 ] = 0</u>
if( ~~availableFlagB₁~~<u>availableFlagb1</u> &&
( !availableFlagN || differentMotion( N, <u>b1</u>~~B₁~~ ) ) )
    extMergeCandList[ i++ ] = <u>b1</u>~~B₁~~
<u>else</u>
    <u>baseCanRemoval[ 1 ] = 0</u>
~~if( availableFlagB₀ )~~
    ~~extMergeCandList[ i++ ] = B₀~~     (I-103)
~~if( availableFlagIvDC &&~~
~~( !availableFlagA₁ || differentMotion( A₁, IvDC ) ) &&~~
    ~~( !availableFlagB₁ || differentMotion( B₁, IvDC ) ) && ( i < ( 5 +~~
~~NumExtraMergeCand ) ) )~~
    ~~extMergeCandList[ i++ ] = IvDC~~ if( availableFlagVSP && !ic_flag && iv_res_pred_weight_idx == 0 ~~&& i < ( 5 + NumExtraMergeCand )~~ )

extMergeCandList[ i++ ] = VSP

<u>if( availableFlagIvDC && ( !baseCanRemoval[ 0 ] || differentMotion( b0, IvDC ) ) &&</u>

<u>( !baseCanRemoval[ 1 ] || differentMotion( b1, IvDC ) ) )</u>

<u>extMergeCandList[ i++ ] = IvDC</u> if( ~~availableFlagA₀~~<u>availableFlagb2</u> ~~&& i < ( 5 + NumExtraMergeCand )~~ )

extMergeCandList[ i++ ] = <u>b2</u>~~A₀~~

~~if( availableFlagB₂ && i < ( 5 + NumExtraMergeCand ) )~~

~~extMergeCandList[ i++ ] = B₂~~

<u>if( availableFlagIvMCShift )</u>

<u>IvShift = IvMCShift</u>

<u>else if ( availableFlagIvDCShift )</u>

<u>IvShift = IvDCShift</u> if( <u>(</u> availableFlagIvMCShift ~~&& i < ( 5 + NumExtraMergeCand )~~ &&

( !availableFlagIvMC || differentMotion( IvMC, IvMCShift ) ) )

<u>||</u>

<u>availableFlagIvDCShift )</u> extMergeCandList[ i++ ] = Iv~~MC~~Shift

<u>for( N = 3; i < MaxNumMergeCand ; N++ )</u>

<u>extMergeCandList[ i++ ] = bN</u>

8. ~~The variable availableFlagIvDCShift is set equal to 0, and when availableFlagIvMCShift is equal to 0, DepthFlag is equal to 0, and i is less than ( 5 + NumExtraMergeCand ), the derivation process for the shifted disparity merge candidate as specified in subclause I.8.5.3.2.15 is invoked with the luma location ( xPb, yPb ), the variables nPbW and nPbH, and the availability flags availableFlagN, the reference indices refIdxL0N and refIdxL1N, the prediction list utilization flags predFlagL0N and predFlagL1N, the motion vectors mvL0N and mvL1N, of every candidate N being in extMergeCandList, extMergeCandList, and i as inputs, and the outputs are the flag availableFlagIvDCShift, the prediction utilization flags predFlagL0IvDCShift~~

~~and predFlagL1IvDCShift, the reference indices refIdxL0IvDCShift and refIdxL1IvDCShift, and the motion vectors mvL0IvDCShift and mvL1IvDCShift.~~

~~9. The merge candidate list, extMergeCandList, is constructed as follows:~~

~~if( availableFlagIvDCShift )~~

~~extMergeCandList[ i++ ] = IvDCShift~~

~~j = 0~~

~~while( i < MaxNumMergeCand ) {   (I-104)~~

~~N = baseMergeCandList[ j++ ]~~

~~if( N != A₁ && N != B₁ && N != B₀ && N != A₀ && N != B₂ )~~

~~extMergeCandList[ i++ ] = N~~

~~}~~

10. The variable N is derived as specified in the following:
    - If ( nOrigPbW + nOrigPbH ) is equal to 12, the following applies:

N = baseMergeCandList[ MergeIdx[ xOrigP ][ yOrigP ] ]          (I-105)

- Otherwise, ( ( nOrigPbW + nOrigPbH ) is not equal to 12 ), the following applies:

N = extMergeCandList[ MergeIdx[ xOrigP ][ yOrigP ] ]          (I-106)

11. ~~The derivation process for a view synthesis prediction flag as specified in subclause I.8.5.3.2.17 is invoked with the luma location ( xCb, yCb ), the luma location ( xPb, yPb ), the variables nPbW and nPbH, the merge candidate indicator N as the inputs, and the output is the mergeCandIsVspFlag.~~

12. The variable vspModeFlag is derived as specified in the following:

vspModeFlag = ~~mergeCandIsVspFlag~~( N == VSP ) && !ic_flag &&

( iv_res_pred_weight_idx == 0 ) && availableFlagVSP    (I-107)

13. The variable subPbMotionFlag is derived as specified in the following:

subPbMotionFlag = ( ( ( N == IvMC ) && ( PartMode == PART_2Nx2N ) )

|| vspModeFlag ) && !dbbp_flag          (I-108)

14. The following assignments are made with X being replaced by 0 or 1:

mvLX = subPbMotionFlag ? 0 : mvLXN (I-109)

refIdxLX = subPbMotionFlag ? −1 : refIdxLXN   (I-110)

predFlagLX = subPbMotionFlag ? 0 : predFlagLXN   (I-111)

15. When predFlagL0 is equal to 1 and predFlagL1 is equal to 1, and ( nOrigPbW + nOrigPbH ) is equal to 12, the following applies:

refIdxL1 = −1   (I-112)

predFlagL1 = 0   (I-113)

16. The disparity availability flag ivpMvFlag is derived as follows:

ivpMvFlag = !DepthFlag && ( ( N = = IvMC ) || ( N = = IvMCShift ) )   (I-114)

17. The variable dispDerivedDepthFlag is derived as follows:

dispDerivedDepthFlag = ( N = = D )   (I-115)

I.8.5.3.2.15 Derivation process for the shifted disparity merge candidate

This process is not invoked when DepthFlag is equal to 1.

Inputs to this process are:

– a luma location ( xPb, yPb ) of the top-left sample of the current luma prediction block relative to the top-left luma sample of the current picture, – two variables nPbW and nPbH specifying the width and the height of the current luma prediction block, – the availability flags availableFlagN, – the reference indices refIdxL0N and refIdxL1N, – the prediction list utilization flags predFlagL0N and predFlagL1N, – the motion vectors mvL0N and mvL1N, – a merge candidate list mergeCandList, – the variable numMergeCand specifying the number of merge candidates in list mergeCandList.

Outputs of this process are:

– the flag availableFlagIvDCShift, specifying whether shifted disparity merge candidate is available, – the prediction utilization flags predFlagL0IvDCShift and predFlagL1IvDCShift, – the reference indices refIdxL0IvDCShift and refIdxL1IvDCShift, – the motion vectors mvL0IvDCShift and mvL1IvDCShift.

The variable availableFlagIvDCShift is set equal to 0 and for i in the range of 0 to min( 2, MaxNumMerge - 1 ), inclusive, the following applies:

- The variable N is set equal to mergeCandList[ i ].
- ~~The derivation process for a view synthesis prediction flag as specified in subclause I.8.5.3.2.17 is invoked with the luma location ( xPb, yPb ), the variables nPbW and nPbH, the merge candidate indicator N as inputs, and the output is the mergeCandIsVspFlag.~~
- When availableFlagIvDCShift is equal to 0 ~~and availableFlagN is equal to 1, the candidate N is not equal to IvMC or IvDC, and mergeCandIsVspFlag is not equal to 0~~, predFlagL0N is equal to 1 and ViewIdx( RefPicList0[ refIdxL0N ] ) is not equal to ViewIdx, the following applies:
    - availableFlagIvDCShift is set equal to 1
    - predFlagLXIvDCShift is set equal to predFlagLXN, ( with X being replaced by 0 and 1 )
    - refIdxLXIvDCShift is set equal to refIdxLXN, ( with X being replaced by 0 and 1 )
    - mvL0IvDCShift[ 0 ] is set equal to mvL0N[ 0 ] + 4
    - mvL0IvDCShift[ 1 ] is set equal to
      ( view_synthesis_pred_flag[ nuh_layer_id ] ? 0 : mvL0N[ 1 ] )
    - mvL1IvDCShift = mvL1N When availableFlagIvDCShift is equal to 0 and availableFlagIvDC is equal to 1, availableFlagIvDCShift is set to 1 and the following applies for X being 0 to 1, inclusive:

- predFlagLXIvDCShift is set equal to predFlagLXIvDC,
- refIdxLXIvDCShift is set equal to refIdxLXIvDC,
- mvLXIvDCShift[ 0 ] is set equal to mvL0IvDC[ 0 ] + 4
- mvLXIvDCShift[ 1 ] is set equal to mvL0IvDC[ 1 ]

~~I.8.5.3.2.17 Derivation process for a view synthesis prediction flag~~
~~Inputs to this process are:~~
- ~~a luma location ( xCb, yCb ) of the top-left sample of the current luma coding block relative to the top-left luma sample of the current picture,~~
- ~~a luma location ( xPb, yPb ) of the top-left sample of the current luma prediction block relative to the top-left luma sample of the current picture,~~
- ~~two variables nPbW and nPbH specifying the width and the height of the current prediction block,~~

~~- a merge candidate indicator N, specifying the merge candidate.~~

~~Outputs of this process are:~~

~~- a variable mergeCandIsVspFlag specifying, whether the merge candidate is a view synthesis prediction merge candidate.~~

~~The variable mergeCandIsVspFlag is derived as specified in the following:~~

~~- If N is equal to VSP, mergeCandIsVspFlag is set equal to 1,~~

~~- Otherwise, if N is equal to A1, B1, B0, A0, or B2, the following applies:~~

~~- The luma position ( xN, yN ) is specified in Table I 9 depending on N.~~

~~- If one of the following conditions is true, the variable mergeCandIsVspFlag is set equal to VspModeFlag[ xN ][ yN ].~~

~~- N is equal to A1 or A0~~

~~- N is equal to B0, B1, or B2 and ( yN >> Log2CtbSizeY ) is equal to ( yCb >> Log2CtbSizeY )~~

~~- Otherwise, ,mergeCandIsVspFlag is set equal to 0.~~

~~- Otherwise, mergeCandIsVspFlag is set equal to 0.~~

~~Table I 9 — Specification of xN and yN depending on N~~

| | ~~A1~~ | ~~B1~~ | ~~B0~~ | ~~A0~~ | ~~B2~~ |
|---|---|---|---|---|---|
| ~~N~~ | ~~xPb − 1~~ | ~~xPb + nPbW − 1~~ | ~~xPb + nPbW~~ | ~~xPb − 1~~ | ~~xPb − 1~~ |
| ~~N~~ | ~~yPb + nPbH − 1~~ | ~~yPb − 1~~ | ~~yPb − 1~~ | ~~yPb + nPbH~~ | ~~yPb − 1~~ |

I.8.5.3.2.18 Derivation Process for the Base Merge Candidate List

The specifications in subclause 8.5.3.2.1 apply, with the following modifications:

Steps 9 and 10 are removed.

"When slice_type is equal to B, the derivation process for combined bi-predictive merge candidates" is replaced by "When slice_type is equal to B and numMergeCand is less than 5, the derivation process for combined bi-predictive merge candidates"

"temporal luma motion vector prediction in subclause 8.5.3.2.7 is invoked" is replaced by "temporal luma motion vector prediction in subclause I.8.5.3.2.7 is invoked"

The outputs of the process are replaced by:
  a modified luma location (xPb, yPb) of the top-left sample of the current luma prediction block relative to the top-left luma sample of the current picture,
  two variables nPbW and nPbH specifying the modified width and the height of the luma prediction block,
  a modified variable partIdx specifying the modified index of the current prediction unit within the current coding unit.
  an original luma location (xOrigP, yOrigP) of the top-left sample of the current luma prediction block relative to the top-left luma sample of the current picture,
  two variables nOrigPbW and nOrigPbH specifying the original width and the height of the luma prediction block,
  the merge candidate list, mergeCandList, <u>withentriesbeingidentifiedbybNandNbeingequalto0-throughMaxNumMergeCand−1,inclusive</u>,
  the luma motion vectors mvL0N and mvL1N, with N being replaced by all entries of mergeCandList
  the reference indices refIdxL0N and refIdxL1N, with N being replaced by all entries of mergeCandList
  the prediction list utilization flags predFlagL0N and predFlagL1N, with N being replaced by all elements of mergeCandList A description of how video decoder 30 may generate a motion vector candidate list for a second example will now be described. This second example is similar to the first example described above. The main difference is that in this example, video decoder 30 inserts the BVSP merge candidate into the motion vector candidate list after the DV candidate.

1. Video decoder 30 invokes the HEVC merge list generation processes:
   a. Spatial merge candidates (SMC) $A_1$, $B_1$ and $B_0$ are added to the merge candidate list.
   b. Spatial merge candidates (SMC) $A_0$ and $B_2$ are added to the merge candidate list.
   c. Temporal merge candidate is added to the merge candidate list as the current design. (Note that the TMVP candidate has been changed in 3D-HEVC).
2. Video decoder 30 derives a disparity vector and identifies the corresponding block of current PU based on the disparity vector. An IPMC, if derived to be available, is added to the beginning of the merge candidate list.
   a. The IPMC is pruned with the first and second merge candidate already in the list. If they are both available and one is equal to the IPMV, it is removed from the list.
   b. Shifting of the existing candidates applies so that the IPMC and other remaining HEVC merge candidates are consecutively positioned.
3. Video decoder 30 converts the disparity vector to a disparity motion vector and adds the disparity motion vector the merge candidate list at the third position (index starts from 0, unless the available ones are less than three, then the first available position) of the list. This is called a DV candidate. The disparity vector may, for example, be determined using the NBDV or Do-NBDV techniques described above.
   a. Assuming the current DV candidate is in the position T, wherein T is equal to the minimum value of the number of remaining HEVC candidates plus 1 or 3 (can be 1, 2 or 3). The DV candidate is pruned with the merge candidates in the list (CanList) with index equal to 1 through T−1.
   foundPos=−1;

for (*i*=1;*i*<*T*;*i*++)

if (CanList[i] is equal to the DV candidate) {foundPos=i; break;}
   b. Shifting of the existing candidates applies so that the IPMC, the HEVC merge candidates before the DV candidate and other remaining HEVC merge candidates are consecutively positioned.
4. Video decoder 30 inserts the BVSP merge candidate into the merge candidate list in the first available position, if BVSP is enabled for current slice.
5. If additional candidate is the bottom-right IPMC was derived to be available, video decoder 30 compares it with the IPMC derived in step 1. If the additional candidate is not equal to the IPMC in step 1 or if the additional candidate is a DSMV (when the additional IPMC is unavailable), then video decode 30 inserts the additional candidate at the end of the merge list (in the first available position).
6. Video decoder 30 may add other motion vector merge candidates to the merge candidate list if the number of valid candidates is less than the maximum number.

Description of the whole merge list generation process for a third example will now be described. In this example, when invoking HEVC merge list generation process, a partial HEVC merge list may be generated which includes candidates generated from spatial and temporal neighboring blocks. Then, 3D-HEVC merge candidates are generated and inserted to the list. Finally, if the merge candidate number is still smaller than the maximum number, additional virtual candidates are generated. In this example, a full HEVC merge list (with maximum number of merge candidates) is generated when invoking the HEVC merge list generation process. Then additional 3D-HEVC merge candidates are generated and inserted to the list. If the list size is larger than the maximum number, it is truncated.

Denote maxMrgNum as the maximum merge candidate number in 3D-HEVC. HEVC merge candidates refer to the merge candidates derived in the HEVC merge list generation process.

1. Video decoder 30 invokes the HEVC merge list generation processes to generate maxMrgNum merge candidates:
   a. Spatial merge candidates (SMC) $A_1$, $B_1$ and $B_0$ are added to the merge candidate list.
   b. Spatial merge candidates (SMC) $A_0$ and $B_2$ are added to the merge candidate list.
   c. Temporal merge candidate is added to the merge candidate list as the current design. (Note that the TMVP candidate has been changed in 3D-HEVC).

d. Virtual candidates are added to the merge candidate list as the current design in 3D-HEVC.
2. Video decoder 30 derives s disparity vector and identifies the corresponding block of the current PU based on the disparity vector. Video decoder 30 adds an IPMC, if derived to be available, to the beginning of the merge candidate list.
   a. The IPMC is pruned with the first and second merge candidate already in the list, if one of them is equal to the IPMC, it is marked as unavailable.
      i. If both the first and the second HEVC merge candidates are equal to the IPMC, only the first HEVC merge candidate is marked as unavailable.
      ii. Alternatively, If both the first and the second HEVC merge candidates are equal to the IPMC, both of them are marked as unavailable.
   b. Shifting of the HEVC merge candidates in the list applies so that the
IPMC is put at the first position, i.e., all HEVC merge candidates are shifted backwards by one position.
3. Video decoder 30 may convert the disparity vector to a disparity motion vector and add the disparity motion vector to the merge candidate list at the third position (index starts from 0) of the list. This is called a DV candidate. The disparity vector that is converted may, for example, be a disparity vector that is determined using NBDV or Do-NBDV as described above.
   a. Alternatively, the DV candidate is added to the motion vector candidate list at the second position of the list.
   b. Alternatively, the DV candidate is added to the motion vector candidate list at the fourth position of the list.
   c. When the DV candidate is added at the third or fourth position, it is pruned with the first and second HEVC merge candidate in the list. If one of them is available and is equal to the DV candidate, the DV candidate is marked as unavailable.
   d. Alternatively, when the DV candidate is added at the second position, it is pruned with the first and second HEVC merge candidates in the list. If the first HEVC merge candidate is available and equal to the DV candidate, the DV candidate is marked as unavailable; otherwise, if the second HEVC merge candidate is available and equal to the DV candidate, the second HEVC candidate is marked as unavailable.
   f. Shifting of the HEVC merge candidates in the list applies so that the DV candidate is put at the given position (the second, third or fourth position), i.e., HEVC merge candidates after the given position (including the HEVC merge candidate at the given position) are shifted backwards by one position.
4. If video decoder 30 inserts the DV candidate at the second position of the list, then video decoder 30 may insert the BVSP merge candidate into the motion vector candidate list at the third position of the list (index starts from 0), if BVSP is enabled for current slice.
   a. Alternatively, when DV candidate is inserted at the second position of the list, BVSP merge candidate is inserted at the fourth position of the list.
   b. Alternatively, when DV candidate is inserted at the third position of the list, BVSP merge candidate is inserted at the fourth position of the list.
   c. Alternatively, BVSP merge candidate is inserted at the fifth position of the list.
   d. Shifting of the HEVC merge candidates in the list applies so that the BVSP is put at the given position (the third, fourth or fifth position), i.e., HEVC merge candidates after the given position (including the HEVC merge candidate at the given position) are shifted backwards by one position.
5. If additional candidate is the bottom-right IPMC was derived to be available, it is compared with the IPMC in step 1. If it is not equal to the IPMC in step 1 or if the additional candidate is a DSMV (when the additional IPMC is unavailable), the generated additional candidate is inserted at the sixth position (index starts from 0) of the list.
   a. Alternatively, the additional candidate is inserted at the seventh position of the list.
   b. Shifting of the HEVC merge candidates in the list applies so that the additional candidate is put at the given position (the sixth or seventh position), i.e., HEVC merge candidates after the given position (including the HEVC merge candidate at the given position) are shifted backwards by one position.
6. Video decoder 30 may remove, from the candidate list, candidates that are marked as unavailable, and then truncate the list so that it includes only maxMrgNum candidates.

Figure 8:
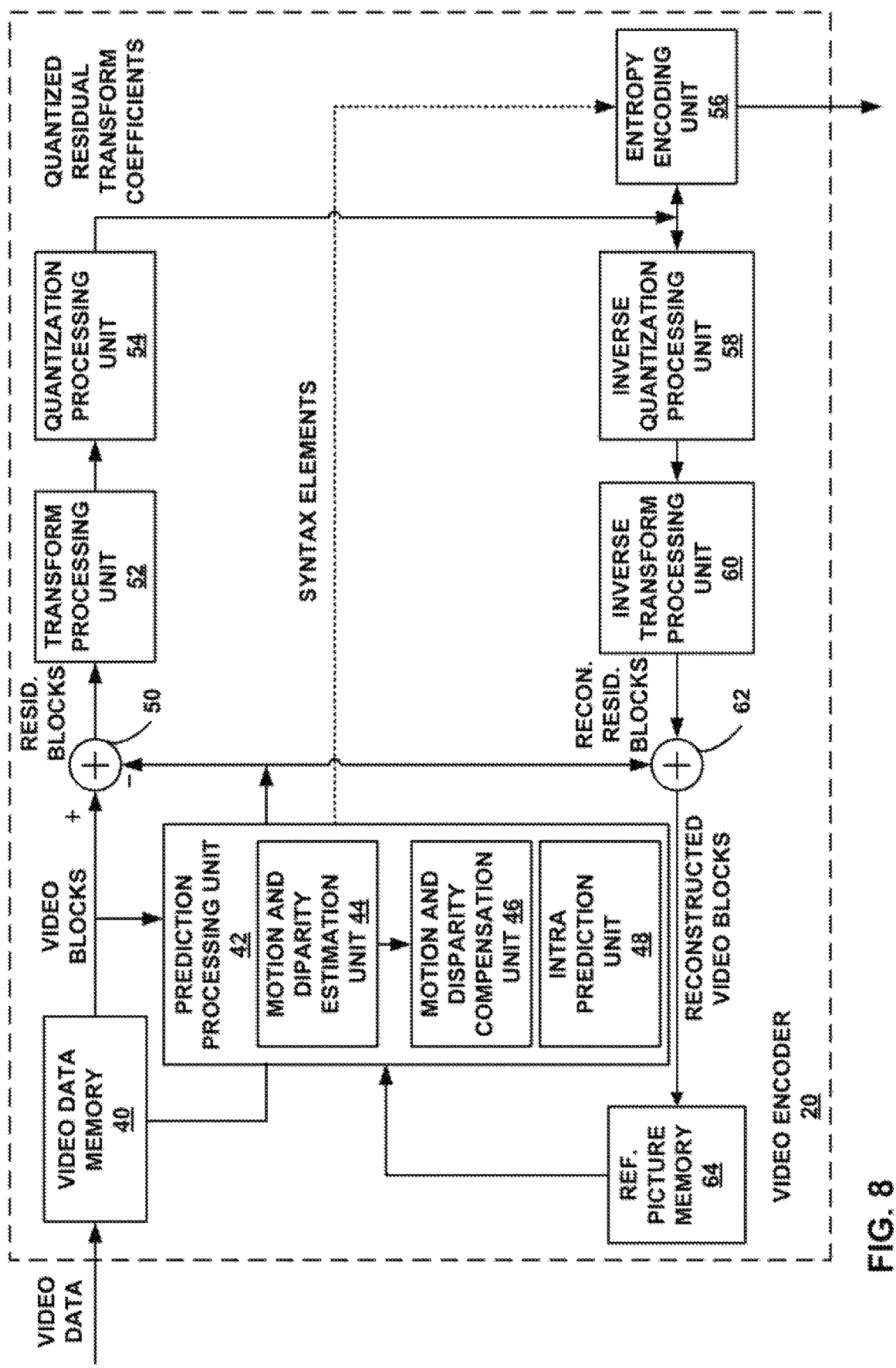
FIG. 8 shows an example of a video encoder configured to implement techniques described in this disclosure.

FIG. 8 is a block diagram illustrating an example of a video encoder that may implement the motion vector candidate list generation techniques described in this disclosure. For example, FIG. 8 illustrates video encoder 20 which may represent either a 3D-AVC compliant or a 3D-HEVC compliant video encoder. Video encoder 20 will be described using certain HEVC terminology such as PUs, TUs, and CUs, but it should be understood that the techniques described with reference to video encoder 20 may also be performed with video coded according to the H.264 standard.

Video encoder 20 may perform intra- and inter-coding of video blocks within video slices. For example, video encoder 20 may perform inter-prediction encoding or intra-prediction encoding. Intra-coding relies on spatial prediction to reduce or remove spatial redundancy in video within a given video frame or picture. Inter-coding relies on temporal prediction or inter-view prediction to reduce or remove temporal redundancy within adjacent frames or pictures of a video sequence or redundancy between pictures in different views. Intra-mode (I mode) may refer to any of several spatial based compression modes. Inter-modes, such as uni-directional prediction (P mode) or bi-prediction (B mode), may refer to any of several temporal-based compression modes.

In the example of FIG. 8, video encoder 20 includes video data memory 40, prediction processing unit 42, reference picture memory 64, summer 50, transform processing unit 52, quantization processing unit 54, and entropy encoding unit 56. Prediction processing unit 42 includes motion and disparity estimation unit 44, motion and disparity compensation unit 46, and intra-prediction unit 48. For video block reconstruction, video encoder 20 also includes inverse quantization processing unit 58, inverse transform processing unit 60, and summer 62. A deblocking filter (not shown in FIG. 8) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoding picture buffer (DPB that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning (e.g., macroblock partitions and sub-blocks of partitions). Video encoder 20 generally illustrates the components that encode video blocks within a video slice to be encoded. The slice may be divided into multiple video blocks (and possibly into sets of video blocks referred to as tiles). Prediction processing unit 42 may select one of a plurality of possible coding modes, such as one of a plurality of intra coding modes (intra-prediction coding modes) or one of a plurality of inter coding modes (inter-prediction coding modes), for the current video block based on error results (e.g., coding rate and the level of distortion). Prediction processing unit 42 may provide the resulting intra- or inter-coded block to summer 50 to generate residual block data and to summer 62 to reconstruct the encoded block for use as a reference picture.

Intra prediction unit 48 within prediction processing unit 42 may perform intra-predictive coding of the current video block relative to one or more neighboring blocks in the same frame or slice as the current block to be coded to provide spatial compression. Motion and disparity estimation unit 44 and motion and disparity compensation unit 46 within prediction processing unit 42 perform inter-predictive coding of the current video block relative to one or more predictive blocks in one or more reference pictures to provide temporal compression.

Motion and disparity estimation unit 44 may be configured to determine the inter-prediction mode for a video slice according to a predetermined pattern for a video sequence. The predetermined pattern may designate video slices in the sequence as P slices or B slices. Motion and disparity estimation unit 44 and motion and disparity compensation unit 46 may be highly integrated, but are illustrated separately for conceptual purposes. Motion estimation, performed by motion and disparity estimation unit 44, is the process of generating motion vectors, which estimate motion for video blocks. A motion vector, for example, may indicate the displacement of a video block within a current video frame or picture relative to a predictive block within a reference picture.

A predictive block is a block that is found to closely match the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 44 may perform a motion search relative to the full pixel positions and fractional pixel positions and output a motion vector with fractional pixel precision.

Motion and disparity estimation unit 44 calculates a motion vector for a video block in an inter-coded (inter-prediction coded) slice by comparing the position of the video block to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 44 sends the calculated motion vector to entropy encoding unit 56 and motion and disparity compensation unit 46.

Motion compensation, performed by motion and disparity compensation unit 46, may involve fetching or generating the predictive block based on the motion vector determined by motion estimation, possibly performing interpolations to sub-pixel precision. Upon receiving the motion vector for the current video block, motion and disparity compensation unit 46 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 46 may also generate syntax elements associated with the video blocks and the video slice for use by video decoder 30 in decoding the video blocks of the video slice.

Motion and disparity compensation unit 46 may be configured to perform the motion vector candidate list construction techniques described in this disclosure. As one example, motion and disparity compensation unit 46 may add one or more motion vector candidates to a motion vector candidate list; identify, from the one or more motion vector candidates in the motion vector candidate list, a disparity motion vector candidate; based on the disparity motion vector candidate, determine a disparity shifted motion vector (DSMV) candidate; and add the DSMV candidate to the motion vector candidate list.

As another example, motion and disparity compensation unit 46 may analyze one or more spatial neighboring blocks of a current block to determine one or more first motion vector candidates for inclusion in a temporary motion vector candidate list; analyze one or more temporal neighboring blocks to determine one or more second motion vector candidates for inclusion in the temporary motion vector candidate list; determine, based on a disparity vector for the current block, one or more additional candidates for inclusion in the temporary motion vector candidate list, wherein the one or more first motion vector candidates, the one or more second motion vector candidates, and the one or more additional candidates comprise more candidates than a maximum number of candidates in a motion vector candidate list; and remove from the temporary motion vector candidate list, candidates with an index that is greater than a maximum index for the motion vector candidate list.

As another example, motion and disparity compensation unit 46 may add one or more spatial neighboring block candidates to a motion vector candidate list; add one or more temporal neighboring block candidates to a motion vector candidate list; determine an additional candidates based on a disparity vector; compare the additional candidate to a candidate from a fixed position in the motion vector candidate list.

Intra-prediction unit 48 may intra-predict a current block, as an alternative to the inter-prediction performed by motion and disparity estimation unit 44 and motion and disparity compensation unit 46, as described above. In particular, intra-prediction unit 48 may determine an intra-prediction mode to use to encode a current block. In some examples, intra-prediction unit 48 may encode a current block using various intra-prediction modes, e.g., during separate encoding passes, and intra-prediction unit 48 (or a mode select unit, in some examples) may select an appropriate intra-prediction mode to use from the tested modes. For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 48 may calculate ratios from the distortions and rates for the various encoded blocks to determine which intra-prediction mode exhibits the best rate-distortion value for the block.

In any case, after selecting an intra-prediction mode for a block, intra-prediction unit 48 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 42 generates the predictive block for the current video block via either inter-prediction or intra-prediction, video encoder 20 forms a residual video block by subtracting the predictive block from the current video block. The residual video data in the residual block may be applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization processing unit 58 and inverse transform processing unit 60 apply inverse quantization and inverse transformation, respectively, to reconstruct the residual block in the pixel domain for later use as a reference block of a reference picture. Motion and disparity compensation unit 46 may calculate a reference block by adding the residual block to a predictive block of one of the reference pictures within one of the reference picture lists. Motion and disparity compensation unit 46 may also apply one or more interpolation filters to the reconstructed residual block to calculate sub-integer pixel values for use in motion estimation. Summer 62 adds the reconstructed residual block to the motion compensated prediction block produced by motion and disparity compensation unit 46 to produce a reference block for storage in reference picture memory 64. The reference block may be used by motion and disparity estimation unit 44 and motion and disparity compensation unit 46 as a reference block to inter-predict a block in a subsequent video frame or picture.

In this manner, video encoder 20 is an example of a video encoder that may be configured to implement one or more example techniques described in this disclosure. For example, video data memory 40 stores video data. The video data may include a texture video component of a dependent view and a depth view component that corresponds to the texture view component, each of which video encoder 20 is to encode in a 3D-AVC compliant or 3D-HEVC compliant video coding process.

In the techniques described in this disclosure, video encoder 20 may include one or more processors that are configured to encode, in a 3D-AVC compliant or 3D-HEVC compliant video coding process, a texture view component of a dependent view of the video data. As described above, each view in a 3D-AVC includes a texture view component and depth view component. There is one base view and one or more enhancement or dependent views in 3D-AVC, where texture view components of the one or more enhancement or dependent views may be inter-view predicted.

To encode the texture view component, video encoder 20 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video encoder 20 may derive a disparity vector for the current block based on the disparity motion vector for one of the neighboring blocks. For texture-first coding, video encoder 20 may encode a depth view component, of the video data, that corresponds to the texture view component subsequent to encoding the texture view component.

In some examples, prediction processing unit 42 of video encoder 20 may be one example of a processor configured to implement the examples described in this disclosure. In some examples, a unit (e.g., one or more processors) other than prediction processing unit 42 may implement the examples described above. In some examples, prediction processing unit 42 in conjunction with one or more other units of video encoder 20 may implement the examples described above. In some examples, a processor of video encoder 20 (not shown in FIG. 8) may, alone or in conjunction with other processors of video encoder 20, implement the examples described above.

Figure 9:
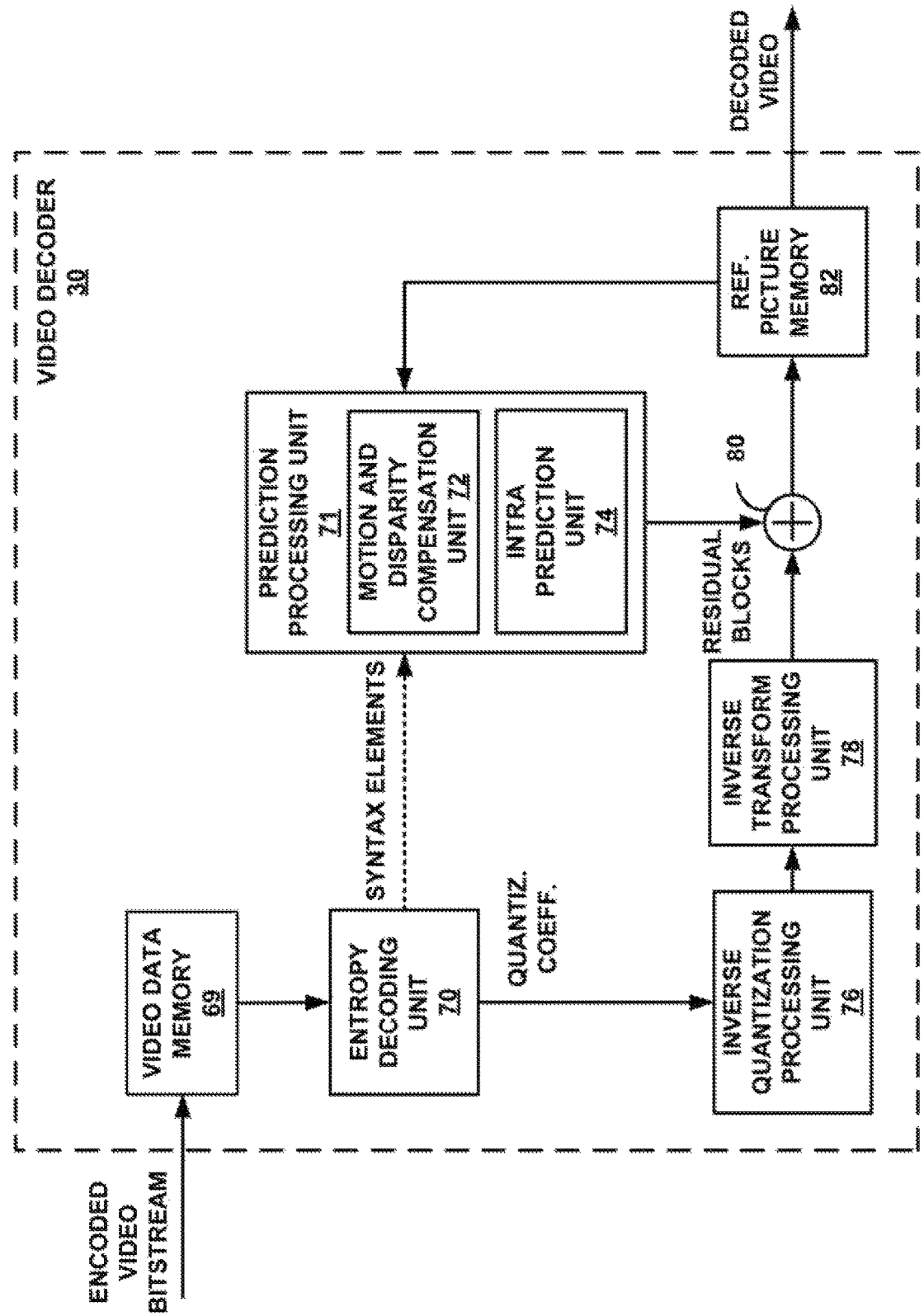
FIG. 9 shows an example of a video decoder configured to implement techniques described in this disclosure.

FIG. 9 is a block diagram illustrating an example of a video decoder that may implement the motion vector candidate list generation techniques described in this disclosure. FIG. 9 is a block diagram illustrating an example of a video decoder that may implement the techniques described in this disclosure. For example, FIG. 9 illustrates video decoder 30 which may represent either a 3D-AVC compliant or a 3D-HEVC compliant video decoder. Video decoder 30 will be described using certain HEVC terminology such as PUs, TUs, and CUs, but it should be understood that the techniques described with reference to video decoder 30 may also be performed with video coded according to the H.264 standard.

Video decoder 30 may perform inter-prediction decoding or intra-prediction decoding. FIG. 9 illustrates video decoder 30. In the example of FIG. 9, video decoder 30 includes video data memory 69, entropy decoding unit 70, prediction processing unit 71, inverse quantization processing unit 76, inverse transform processing unit 78, summer 80, and reference picture memory 82. Prediction processing unit 71 includes motion and disparity compensation unit 72 and intra-prediction unit 74. Video decoder 30 may, in some examples, perform a decoding pass generally reciprocal to the encoding pass described with respect to video encoder 20 from FIG. 8.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to prediction processing unit 71. Video decoder 30 may receive the syntax elements at the video slice level and/or the video block level.

When the video slice is coded as an intra-coded (I) slice, intra-prediction unit 74 of prediction processing unit 71 may generate prediction data for a video block of the current video slice based on a signaled intra-prediction mode and data from previously decoded blocks of the current frame or picture. When the video frame is coded as an inter-coded (i.e., B or P) slice, motion and disparity compensation unit 72 of prediction processing unit 71 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists (RefPicList0 and RefPicList1) using default construction techniques based on reference pictures stored in reference picture memory 82.

Motion and disparity compensation unit 72 determines prediction information for a video block of the current video slice by parsing the motion vectors and other syntax elements, and uses the prediction information to produce the predictive blocks for the current video block being decoded. For example, motion and disparity compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion and disparity compensation unit 72 may be configured to perform the motion vector candidate list construction techniques described in this disclosure. As one example, motion and disparity compensation unit 72 may add one or more motion vector candidates to a motion vector candidate list; identify, from the one or more motion vector candidates in the motion vector candidate list, a disparity motion vector candidate; based on the disparity motion vector candidate, determine a disparity shifted motion vector (DSMV) candidate; and add the DSMV candidate to the motion vector candidate list.

As another example, motion and disparity compensation unit 72 may analyze one or more spatial neighboring blocks of a current block to determine one or more first motion vector candidates for inclusion in a temporary motion vector candidate list; analyze one or more temporal neighboring blocks to determine one or more second motion vector candidates for inclusion in the temporary motion vector candidate list; determine, based on a disparity vector for the current block, one or more additional candidates for inclusion in the temporary motion vector candidate list, wherein the one or more first motion vector candidates, the one or more second motion vector candidates, and the one or more additional candidates comprise more candidates than a maximum number of candidates in a motion vector candidate list; and remove from the temporary motion vector candidate list, candidates with an index that is greater than a maximum index for the motion vector candidate list.

As another example, motion and disparity compensation unit 72 may add one or more spatial neighboring block candidates to a motion vector candidate list; add one or more temporal neighboring block candidates to a motion vector candidate list; determine an additional candidates based on a disparity vector; compare the additional candidate to a candidate from a fixed position in the motion vector candidate list.

Motion and disparity compensation unit 72 may also perform interpolation based on interpolation filters. Motion and disparity compensation unit 72 may use interpolation filters as used by video encoder 20 during encoding of the video blocks to calculate interpolated values for sub-integer pixels of reference blocks. In this case, motion and disparity compensation unit 72 may determine the interpolation filters used by video encoder 20 from the received syntax elements and use the interpolation filters to produce predictive blocks.

Inverse quantization processing unit 76 inverse quantizes (i.e., de-quantizes), the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform (e.g., an inverse DCT, an inverse integer transform, or a conceptually similar inverse transform process), to the transform coefficients in order to produce residual blocks in the pixel domain.

After motion and disparity compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion and disparity compensation unit 72. Summer 80 represents the component or components that perform this summation operation. If desired, a deblocking filter may also be applied to filter the decoded blocks in order to remove blocking artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 is an example of a video decoder that may be configured to implement one or more example techniques described in this disclosure. For example, video data memory 69 stores video data. The video data may include information from which video decoder 30 can decode a texture video component of a dependent view and a depth view component that corresponds to the texture view component, each of which video encoder 20 is encoded in a 3D-AVC compliant or 3D-HEVC compliant video coding process.

In the techniques described in this disclosure, video decoder 30 may include one or more processors that are configured to decode, in a 3D-AVC compliant or 3D-HEVC compliant video coding process, a texture view component of a dependent view of the video data. To decode the texture view component, video decoder 30 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video decoder 30 may derive a disparity vector for the current block based on the disparity motion vector for one of the neighboring blocks. For texture-first coding, video decoder 30 may decode a depth view component, of the video data, that corresponds to the texture view component subsequent to decoding the texture view component.

In some examples, prediction processing unit 71 of video decoder 30 may be one example of a processor configured to implement the examples described in this disclosure. In some examples, a unit (e.g., one or more processors) other than prediction processing unit 71 may implement the examples described above. In some examples, prediction processing unit 71 in conjunction with one or more other units of video decoder 30 may implement the examples described above. In yet some other examples, a processor of video decoder 30 (not shown in FIG. 9) may, alone or in conjunction with other processors of video decoder 30, implement the examples described above.

Figure 10:
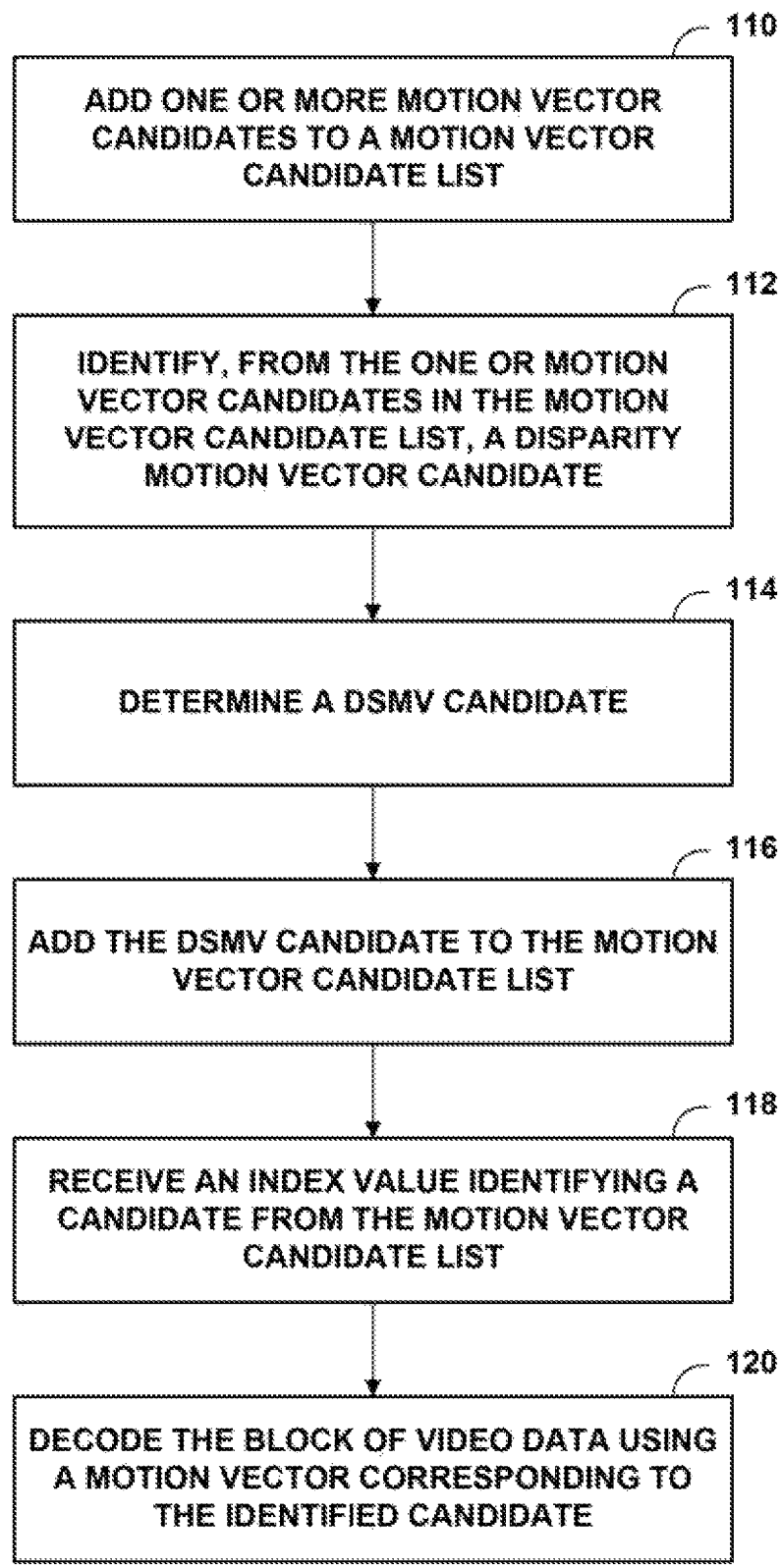
FIG. 10 shows a flowchart showing an example method of decoding video data according to the techniques of this disclosure.

FIG. 10 is a flowchart illustrating a motion vector candidate list construction technique according to this disclosure. The techniques of FIG. 10 will be described with respect to a video decoder, which may, for example, correspond to video decoder 30 described above, although it is contemplated the techniques of FIG. 10 may also be implemented by other types of video decoders.

The video decoder may add one or more motion vector candidates to a motion vector candidate list (110). The motion vector candidates may, for example, be candidates derived using the merge mode of the base HEVC specification, and may include one or both of temporal motion vectors and disparity motion vectors. The video decoder may identify, from the one or more motion vector candidates in the motion vector candidate list, a disparity motion vector candidate (112). Thus, instead of re-checking the candidates for specific spatial neighboring blocks or temporal neighboring blocks to determine if those candidates include a disparity motion vector, the video decoder may check one or more specific entries in the motion vector candidate list to determine if that entry includes disparity motion vector. For example, the video decoder may check the second entry in the motion vector candidate list to determine if that entry includes a disparity motion vector regardless of what spatial neighbor or temporal neighbor the second entry might be associated with. In some implementations, the video decoder may identify the disparity motion vector from a motion vector candidate list that only includes HEVC candidates (e.g. with no 3D-HEVC candidates), or if a motion vector candidate list does include 3D-HEVC candidates, may only look at the HEVC candidates in the motion vector candidate list.

The video decoder may, for example, identify the disparity motion vector candidate by identifying a first available disparity motion vector candidate from the first N candidates in the motion vector candidate list, wherein N is an integer number that is less than a maximum number of candidates. The video decoder may, for example, identify a first available disparity motion vector candidate corresponding to a reference picture list from the first N candidates in the motion vector candidate list, wherein N is an integer number. In other examples, the video decoder may identify the disparity motion vector candidate by identifying a first available disparity motion vector candidate from the first N candidates in the motion vector candidate list, excluding the first candidate (i.e. ignore candidate with index 0), wherein N is an integer number that is less than a maximum number of candidates. In some example, N may be equal to 2, while in other examples N may be a different integer value. In some implementations, the first N candidates may include one or more virtual candidates, while in other implementations, the first N candidates may not include virtual candidates. The video decoder may be configured to identify the disparity motion vector candidate in response to an IPMC candidate being unavailable. In the examples above, the first N candidates may also be restricted to be the first N HEVC candidates (e.g. excluding any 3D-HEVC candidates).

Based on the disparity motion vector candidate, the video decoder may determine a DSMV candidate (114). The video decoder may, for example, determine the DSMV candidate using the techniques described above. The video decoder may add the DSMV candidate to the motion vector candidate list (116). When adding the DSMV candidate to the motion vector candidate list, the video decoder may assign the DMSV candidate an index lower than virtual candidates in the motion vector candidate list. For a block of video data, the video decoder may receive an index value identifying a candidate from the motion vector candidate list (118) and decode the block of video data using a motion vector corresponding to the identified candidate (120).

Figure 11:
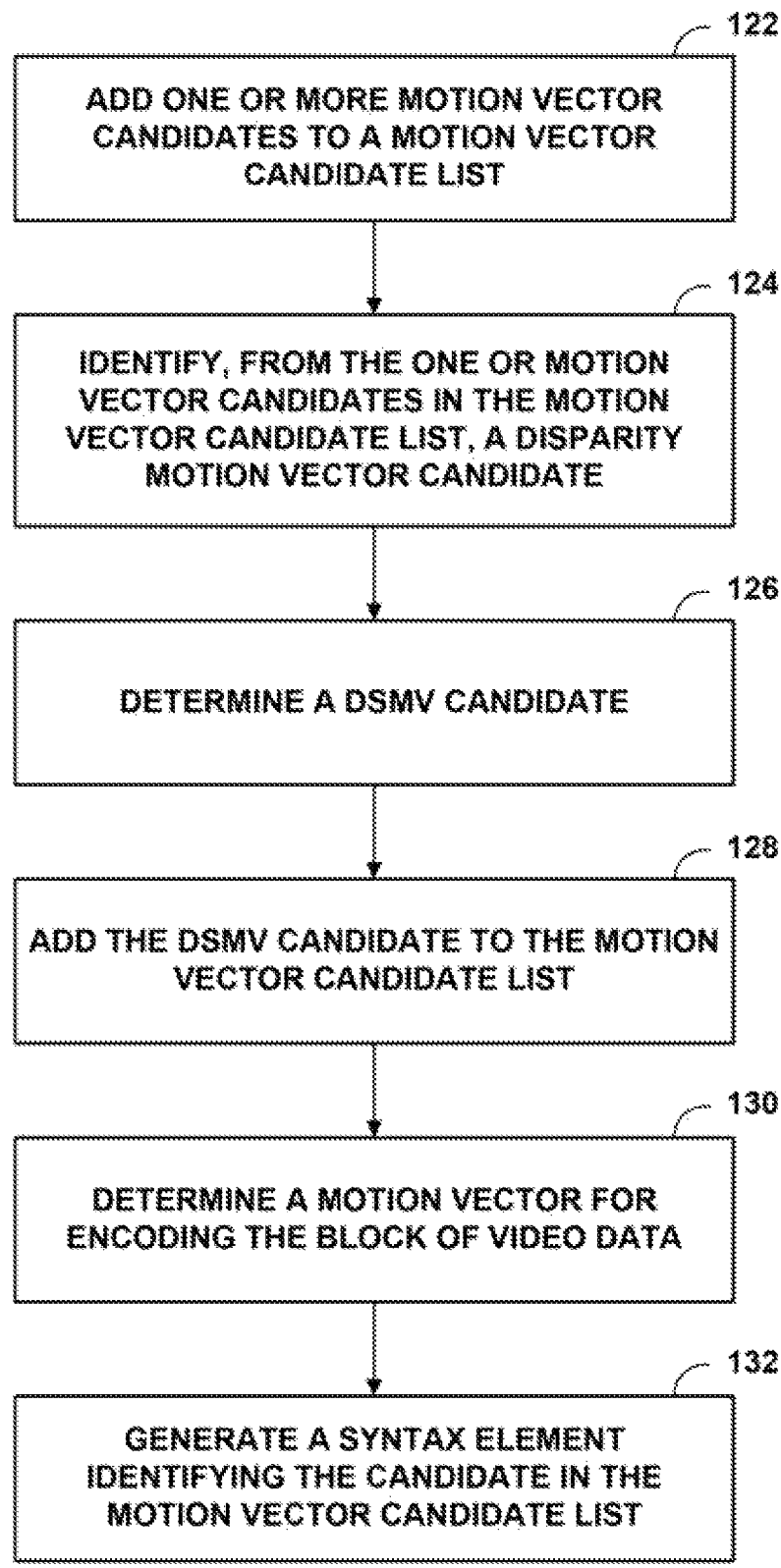
FIG. 11 shows a flowchart showing an example method of encoding video data according to the techniques of this disclosure.

FIG. 11 is a flowchart illustrating a motion vector candidate list construction technique according to this disclosure. The techniques of FIG. 11 will be described with respect to a generic video encoder, which may correspond, for example, to video encoder 20 described above, although it is contemplated the techniques of FIG. 11 may also be implemented by other types of video encoders.

The video encoder may add one or more motion vector candidates to a motion vector candidate list (122). The motion vector candidates may, for example, be candidates derived using the merge mode of the base HEVC specification. The video encoder may identify, from the one or more motion vector candidates in the motion vector candidate list, a disparity motion vector candidate (124). The video encoder may, for example, identify the disparity motion vector candidate by identifying a first available disparity motion vector candidate from the first N candidates in the motion vector candidate list, wherein N is an integer number that is less than a maximum number of candidates. The video encoder may, for example, identify a first available disparity motion vector candidate corresponding to a reference picture list from the first N candidates in the motion vector candidate list, wherein N is an integer number. In some example, N may be equal to 2, while in other examples N may be a different integer value. In some implementations, the first N candidates may include one or more virtual candidates, while in other implementations, the first N candidates may not include virtual candidates. The video encoder may be configured to identify the disparity motion vector candidate in response to an IPMC candidate being unavailable.

Based on the disparity motion vector candidate, the video encoder may determine a DSMV candidate (1126). The video encoder may, for example, determine the DSMV candidate using the techniques described above. The video encoder may add the DSMV candidate to the motion vector candidate list (1128). When adding the DSMV candidate to the motion vector candidate list, the video encoder may assign the DMSV candidate an index lower than virtual candidates in the motion vector candidate list. For a block of video data, the video encoder determines a motion vector for encoding the block of video data (130). The motion vector corresponds to a candidate in the motion vector candidate list. The video encoder generates a syntax element identifying the candidate in the motion vector candidate list (132).

Figure 12:
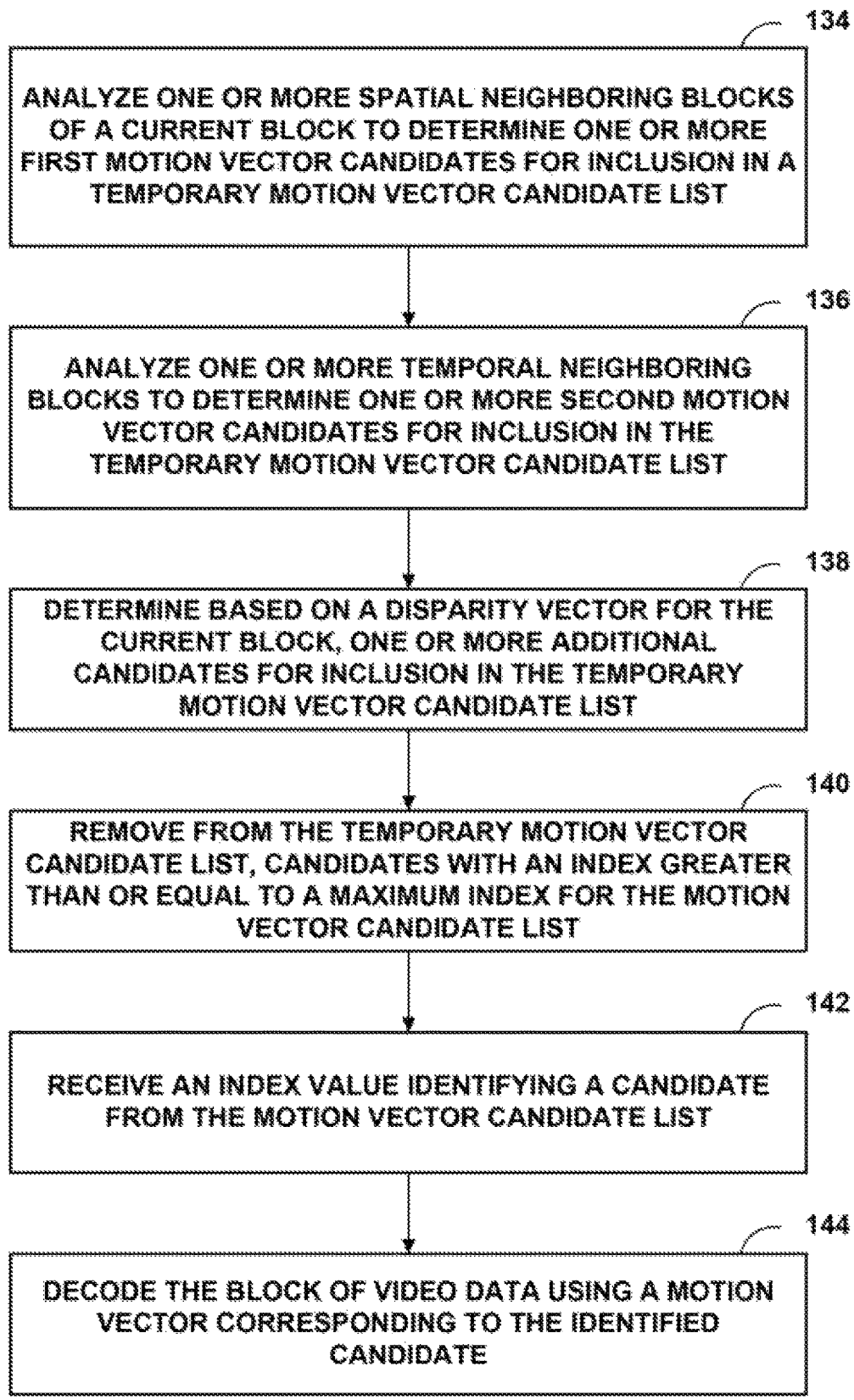
FIG. 12 shows a flowchart showing an example method of decoding video data according to the techniques of this disclosure.

FIG. 12 is a flowchart illustrating a motion vector candidate list construction technique according to this disclosure. The techniques of FIG. 12 will be described with respect to a video decoder, which may, for example, correspond to video decoder 30 described above, although it is contemplated the techniques of FIG. 12 may also be implemented by other types of video decoders.

The video decoder may analyze one or more spatial neighboring blocks of a current block to determine one or more first motion vector candidates for inclusion in a temporary motion vector candidate list (134). The first motion vector candidates may include one or both of temporal motion vectors and disparity motion vectors. The spatial neighboring blocks may, for example, correspond to some or all of the spatial neighbors shown in FIG. 4. The video decoder may analyze one or more temporal neighboring blocks to determine one or more second motion vector candidates for inclusion in the temporary motion vector candidate list (136). The second motion vector candidates may include one or both of temporal motion vectors and disparity motion vectors. The video decoder may determine based on a disparity vector for the current block, one or more additional candidates for inclusion in the temporary motion vector candidate list (138). The video decoder may, for example, determine the disparity vector using an NBDV or Do-NBDV process as described above. The one or more additional candidates may, for example, include any combination or permutation of BVSP candidates, disparity shifted motion vector candidates, inter-view predicted motion candidates, and bottom-right inter-view predicted motion candidates.

The one or more first motion vector candidates, the one or more second motion vector candidates, and the one or more additional candidates may include more candidates than a maximum number of candidates in a motion vector candidate list. The maximum number may, for example, be five or six. The video decoder may remove from the temporary motion vector candidate list, candidates with an index greater than or equal to a maximum index for the motion vector candidate list (140). Thus, as one example, if the temporary motion vector candidate list has eight entries, and the maximum number of candidates in the motion vector candidate list is six, then the video decoder may remove from the temporary motion vector candidate list the entries with indexes 6 and 7 (with the list starting at index 0) to form the motion vector candidate list.

For a block of video data, the video decoder may receive an index value identifying a candidate from the motion vector candidate list (142). The video decoder decodes the block of video data using a motion vector corresponding to the identified candidate (144).

The video decoder may also generate one or more virtual candidates for inclusion in the temporary motion vector candidate list. In such an example, the number of candidates in the one or more first motion vector candidates, the one or more second motion vector candidates, the one or more virtual candidates, and the one or more additional candidates may include more candidates than the maximum number of candidates in the motion vector candidate list, in which case, the video decoder may remove candidates from the temporary motion vector candidate list as part of generating the motion vector candidate list.

The video decoder may also, either alternatively or additionally, mark one or more candidates of the first motion vector candidates and/or one or more candidates of the second motion vector candidates for removal and, then remove the marked candidates. The marked candidates may be removed after additional candidates are added to the temporary motion vector candidate list. Thus, rather than rearranging the candidates in the list while the list is being constructed, the video decoder may mark candidates for removal but wait to remove, to reduce or avoid such rearranging. After removing candidates marked for removal, the video decoder may then remove excess candidates as necessary to reduce the list down to the maximum number of candidates.

Figure 13:
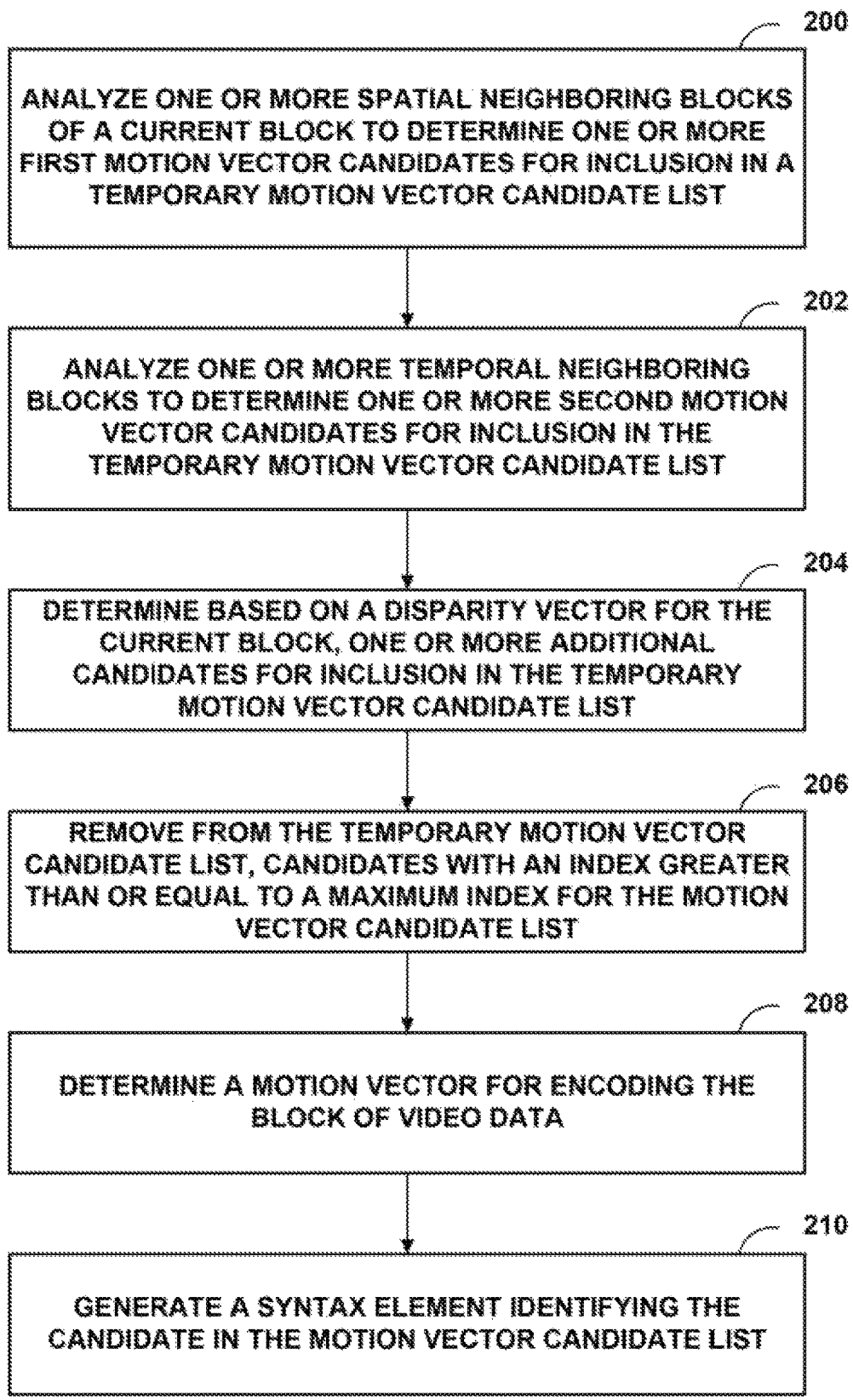
FIG. 13 shows a flowchart showing an example method of encoding video data according to the techniques of this disclosure.

FIG. 13 is a flowchart illustrating a motion vector candidate list construction technique according to this disclosure. The techniques of FIG. 13 will be described with respect to a generic video encoder, which may correspond, for example, to video encoder 20 described above, although it is contemplated the techniques of FIG. 13 may also be implemented by other types of video encoders.

The video encoder may analyze one or more spatial neighboring blocks of a current block to determine one or more first motion vector candidates for inclusion in a temporary motion vector candidate list (200). The spatial neighboring blocks may, for example, correspond to some or all of the spatial neighbors shown in FIG. 4. The video encoder may analyze one or more temporal neighboring blocks to determine one or more second motion vector candidates for inclusion in the temporary motion vector candidate list (202). The video encoder may determine based on a disparity vector for the current block, one or more additional candidates for inclusion in the temporary motion vector candidate list (204). The one or more additional candidates may, for example, include any combination or permutation of BVSP candidates, disparity shifted motion vector candidates, inter-view predicted motion candidates, or bottom-right inter-view predicted motion vector candidates. For a block of video data, the video encoder determines a motion vector for encoding the block of video data (208). The motion vector corresponds to a candidate in the motion vector candidate list. The video encoder generates a syntax element identifying the candidate in the motion vector candidate list (210).

The one or more first motion vector candidates, the one or more second motion vector candidates, and the one or more additional candidates may include more candidates than a maximum number of candidates in a motion vector candidate list. The maximum number may, for example, be five or six. The video encoder may remove from the temporary motion vector candidate list, candidates with an index greater than or equal to a maximum index for the motion vector candidate list (206).

The video encoder may also generate one or more virtual candidates for inclusion in the temporary motion vector candidate list. In such an example, the number of candidates in the one or more first motion vector candidates, the one or more second motion vector candidates, the one or more virtual candidates, and the one or more additional candidates may include more candidates than the maximum number of candidates in the motion vector candidate list, in which case, the video encoder may remove candidates from the temporary motion vector candidate list as part of generating the motion vector candidate list. The video encoder may also, either alternatively or additionally, mark one or more candidates of the first motion vector candidates and/or one or more candidates of the second motion vector candidates for removal and, then remove the marked candidates. The marked candidates may be removed after additional candidates are added to the temporary motion vector candidate list. Thus, rather than rearranging the candidates in the list while the list is being constructed, the video encoder may mark candidates for removal but wait to remove, to reduce or avoid such rearranging.

Figure 14:
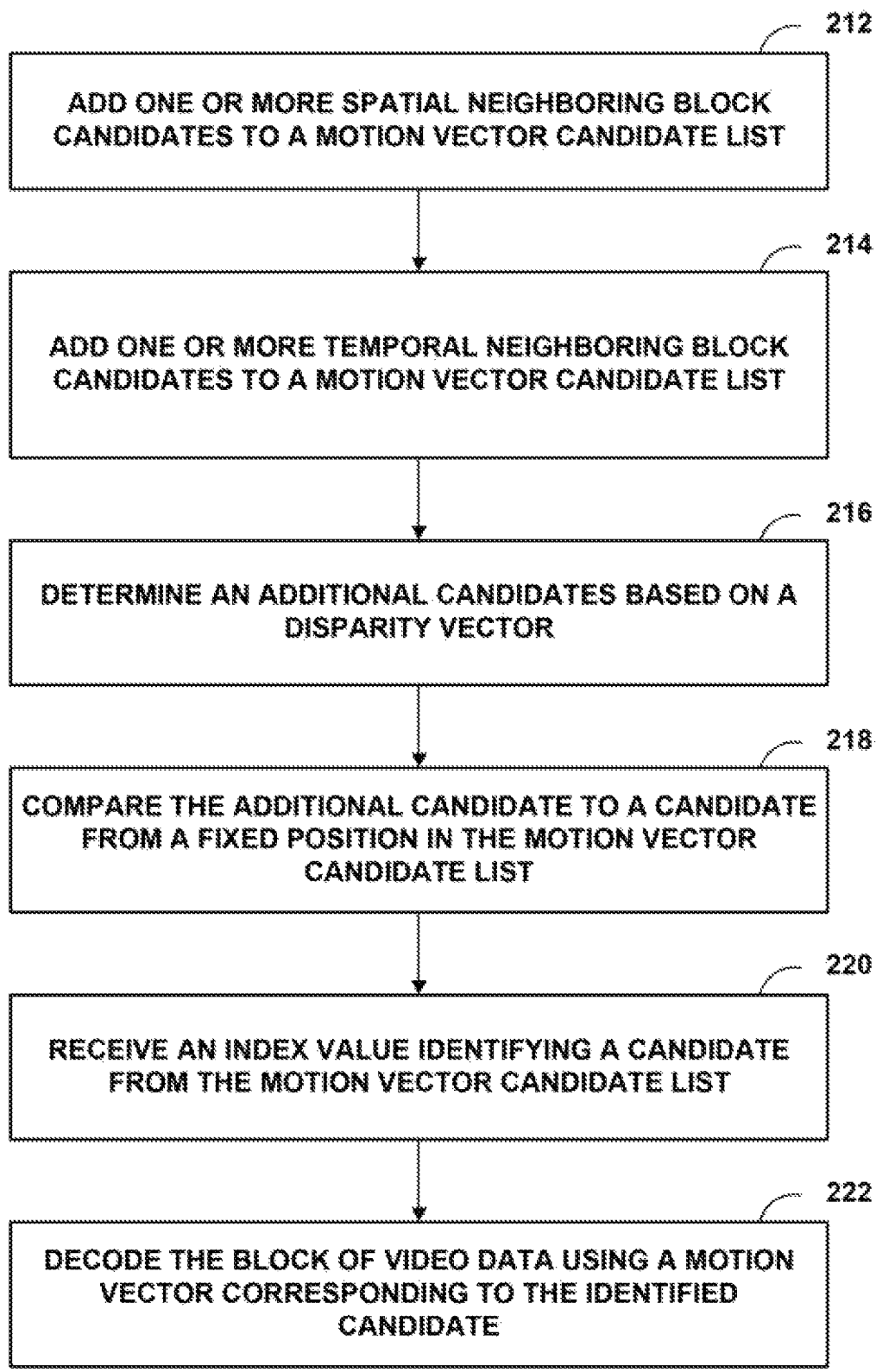
FIG. 14 shows a flowchart showing an example method of decoding video data according to the techniques of this disclosure.

FIG. 14 is a flowchart illustrating a motion vector candidate list construction technique according to this disclosure. The techniques of FIG. 14 will be described with respect to a video decoder, which may, for example, correspond to video decoder 30 described above, although it is contemplated the techniques of FIG. 14 may also be implemented by other types of video decoders.

The video decoder adds one or more spatial neighboring block candidates to a motion vector candidate list (212). The spatial neighboring block candidates are motion vector candidates determined from spatial neighboring blocks, such as some or all of the spatial neighboring blocks shown in FIG. 4. The video decoders adds one or more temporal neighboring block candidates to a motion vector candidate list (214). The video decoder determines an additional candidates based on a disparity vector (216). The additional candidate may, for example, be any of a BVSP candidate, a disparity shifted motion vector candidate, an inter-view predicted motion candidate, or a bottom-right inter-view predicted motion candidate. The video decoder compares the additional candidate to a candidate from a fixed position in the motion vector candidate list (218). Thus, instead of comparing the additional candidate to a candidate from a specific spatial or temporal neighbor, the video decoder may compare the additional candidate to the candidate of a specific index in the motion vector candidate list regardless of what spatial or temporal neighbor that candidate might be associated with.

For a block of video data, the video decoder receives an index value identifying a candidate from the motion vector candidate list (220). The video decodes the block of video data using a motion vector corresponding to the identified candidate (222).

In response to the additional candidate being the same as one of the one or more spatial neighboring block candidates or one of the one or more temporal neighboring block candidates, the video decoder may remove the additional candidate or mark the additional candidate as unavailable and later remove the additional candidate. Alternatively, in response to the additional candidate being the same as one of the one or more spatial neighboring block candidates or one of the one or more temporal neighboring block candidates, the video decoder may remove the one of the one or more spatial neighboring block candidates or one of the one or more temporal neighboring block candidates or mark the one of the one or more spatial neighboring block candidates or one of the one or more temporal neighboring block candidates as unavailable and later remove the additional candidate. The video decoder may also compare the additional candidate to a second candidate from a second fixed position in the motion vector candidate list or compare the additional candidate to the first N candidates in the motion vector candidate list, wherein N is an integer number greater than 1 but less than the maximum number of candidates permitted in the list.

In one particular implementation of the techniques of FIG. 14, the video decoder may not prune (i.e. remove) a BVSP candidate. The video decoder may compare the DSMV with the first and second HEVC merge candidates. If the DSMV is the same as one of the first and second HEVC merge candidates, then the video decoder may mark the DSMV as "unavailable" or "to be removed." The video decoder may compare the IPMC to the first and second HEVC merge candidates. If the IPMC is same as the first HEVC merge candidate, then the video decoder may mark the first HEVC merge candidate as "unavailable" or "to be removed." Otherwise, if the IPMC is the same as the second HEVC merge candidate, then the video decoder may mark the second HEVC merge candidate as "unavailable" or "to be removed." The video decoder may compare the bottom-right IPMC with the IPMC. When the bottom-right IPMC is the same as the IPMC, the video decoder may mark the bottom-right IPMC as "unavailable" or "to be removed."

Figure 15:
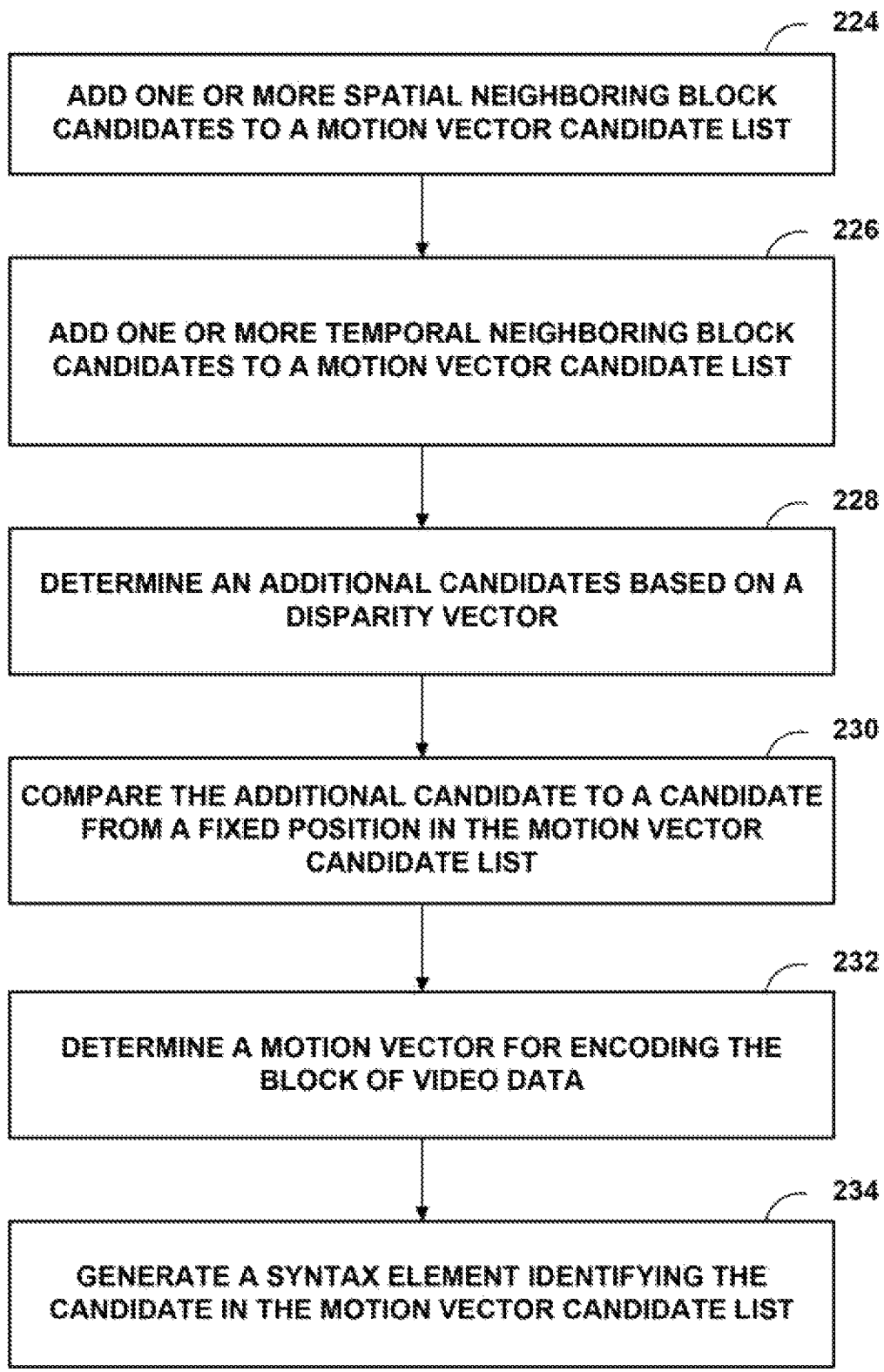
FIG. 15 shows a flowchart showing an example method of encoding video data according to the techniques of this disclosure.

FIG. 15 is a flowchart illustrating a motion vector candidate list construction technique according to this disclosure. The techniques of FIG. 15 will be described with respect to a generic video encoder, which may correspond, for example, to video encoder 20 described above, although it is contemplated the techniques of FIG. 15 may also be implemented by other types of video encoders.

The video encoder adds one or more spatial neighboring block candidates to a motion vector candidate list (224). The spatial neighboring block candidates are motion vector candidates determined from spatial neighboring blocks, such as some or all of the spatial neighboring blocks shown in FIG. 4. The video encoder adds one or more temporal neighboring block candidates to a motion vector candidate list (226). The video encoder determines an additional candidates based on a disparity vector (228). The additional candidate may, for example, be any of a BVSP candidate, a disparity shifted motion vector candidate, an inter-view predicted motion candidate, and a bottom-right inter-view predicted motion candidate. The video encoder compares the additional candidate to a candidate from a fixed position in the motion vector candidate list (230). For a block of video data, the video encoder determines a motion vector for encoding the block of video data (232). The motion vector corresponds to a candidate in the motion vector candidate list. The video encoder generates a syntax element identifying the candidate in the motion vector candidate list (234).

In response to the additional candidate being the same as one of the one or more spatial neighboring block candidates or one of the one or more temporal neighboring block candidates, the video encoder may mark the additional candidate as unavailable and later remove the additional candidate. The video encoder may also compare the additional candidate to a second candidate from a second fixed position in the motion vector candidate list or compare the additional candidate to the first N candidates in the motion vector candidate list, wherein N is an integer number greater than 1 but less than the maximum number of candidates permitted in the list. In the example above, the first N candidates may also be restricted to be the first N HEVC candidates (e.g. excluding any 3D-HEVC candidates).

In some of the description above for FIGS. 10-15, the video decoding techniques may have been described with additional detail or with additional examples than the corresponding video encoding techniques. It should be understood, however, that unless stated otherwise, such additional details and additional examples are also applicable to the encoder description.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding three-dimensional (3D) video data, the method comprising:
    for a block of video data in a current view, adding one or more motion vector candidates to a motion vector candidate list;
    identifying, from the one or more motion vector candidates in the motion vector candidate list, a disparity motion vector candidate, wherein identifying the disparity motion vector candidate comprises identifying a first available disparity motion vector candidate from the first N candidates in the motion vector candidate list, wherein N is an integer number that is less than a maximum number of candidates;

based on the disparity motion vector candidate, determining a disparity shifted motion vector (DSMV) candidate by shifting the disparity motion vector candidate by ((PuWidth/2*4+4), (PuHeight/2*4+4)), wherein PuWidth is a width of a prediction unit (PU) of the block of video data and PuHeight is a height of the PU of the block of video data;

in response to a bottom-right inter-view predicted motion (IPMC) candidate being unavailable, adding the DSMV candidate to the motion vector candidate list;

for the block of video data, receiving an index value identifying a candidate from the motion vector candidate list; and, decoding the block of video data using a motion vector corresponding to the identified candidate.

2. The method of claim 1, wherein identifying the disparity motion vector candidate comprises identifying a first available disparity motion vector candidate corresponding to a reference picture list from the first N candidates in the motion vector candidate list.

3. The method of claim 1, wherein N is equal to 2.

4. The method of claim 1, wherein the first N candidates comprise one or more virtual candidates.

5. The method of claim 1, wherein the first N candidates do not comprise virtual candidates.

6. The method of claim 1, wherein adding the DSMV candidate to the motion vector candidate list comprises assigning the DMSV candidate an index lower than virtual candidates in the motion vector candidate list.

7. A device for decoding three-dimensional (3D) video data, the device comprising:

one or more memory devices configured to store the 3D video data; and one or more processors configured to:

for a block of video data in a current view, add one or more motion vector candidates to a motion vector candidate list for a current block of the 3D video data;

identify, from the one or more motion vector candidates in the motion vector candidate list, a disparity motion vector candidate, wherein to identify the disparity motion vector candidate, the one or more processors are further configured to identify a first available disparity motion vector candidate from the first N candidates in the motion vector candidate list, wherein N is an integer number that is less than a maximum number of candidates;

based on the disparity motion vector candidate, determine a disparity shifted motion vector (DSMV) candidate, wherein to determine the DSMV candidate, the one or more processors are further configured to shift the disparity motion vector candidate by ((PuWidth/2*4+4), (PuHeight/2*4+4)), wherein PuWidth is a width of a prediction unit (PU) of the block of video data and PuHeight is a height of the PU of the block of video data;

in response to a bottom-right inter-view predicted motion (IPMC) candidate being unavailable, add the DSMV candidate to the motion vector candidate list;

for the block of video data, receive an index value identifying a candidate from the motion vector candidate list; and decode the current block using a motion vector corresponding to the identified candidate.

8. The device of claim 7, wherein to identify the disparity motion vector candidate, the one or more processors are further configured to identify a first available disparity motion vector candidate corresponding to a reference picture list from the first N candidates in the motion vector candidate list.

9. The device of claim 7, wherein N is equal to 2.

10. The device of claim 7, wherein the first N candidates comprise one or more virtual candidates.

11. The device of claim 7, wherein the first N candidates do not comprise virtual candidates.

12. The device of claim 7, wherein to add the DSMV candidate to the motion vector candidate list, the one or more processors are further configured to assign the DMSV candidate an index lower than virtual candidates in the motion vector candidate list.

13. A device for encoding three-dimensional (3D) video data, the device comprising:

one or more memory devices configured to store the 3D video data; and one or more processors configured to:

for a block of video data in a current view, add one or more motion vector candidates to a motion vector candidate list for a current block of the 3D video data;

identify, from the one or more motion vector candidates in the motion vector candidate list, a disparity motion vector candidate, wherein to identify the disparity motion vector candidate, the one or more processors are further configured to identify a first available disparity motion vector candidate from the first N candidates in the motion vector candidate list, wherein N is an integer number that is less than a maximum number of candidates;

based on the disparity motion vector candidate, determine a disparity shifted motion vector (DSMV) candidate, wherein to determine the DSMV candidate, the one or more processors are further configured to shift the disparity motion vector candidate by ((PuWidth/2*4+4), (PuHeight/2*4+4)), wherein PuWidth is a width of a prediction unit (PU) of the block of video data and PuHeight is a height of the PU of the block of video data;

in response to a bottom-right inter-view predicted motion (IPMC) candidate being unavailable, add the DSMV candidate to the motion vector candidate list;

determine a candidate from the motion vector candidate list; and encode the current block using a motion vector corresponding to the determined candidate.

14. The device of claim 13, wherein the one or more processors are further configured to identify the disparity motion vector candidate by identifying a first available disparity motion vector candidate corresponding to a reference picture list from the first N candidates in the motion vector candidate list, wherein N is an integer number.

15. The device of claim 13, wherein N is equal to 2.

16. The device of claim 13, wherein the first N candidates comprise one or more virtual candidates.

17. The device of claim 13, wherein the first N candidates do not comprise virtual candidates.

18. The device of claim 13, wherein the one or more processors are further configured to add the DSMV candidate to the motion vector candidate list by assigning the DMSV candidate an index lower than virtual candidates in the motion vector candidate list.

19. The device of claim 13, wherein the device comprises a wireless communication device, further comprising a transmitter configured to transmit encoded video data.

20. The device of claim 19, wherein the wireless communication device comprises a telephone handset and wherein the transmitter is configured to modulate, according to a wireless communication standard, a signal comprising the encoded video data.

21. A method of encoding three-dimensional (3D) video data, the method comprising:

for a block of video data in a current view, adding one or more motion vector candidates to a motion vector candidate list;

identifying, from the one or more motion vector candidates in the motion vector candidate list, a disparity motion vector candidate, wherein identifying the disparity motion vector candidate comprises identifying a first available disparity motion vector candidate from the first N candidates in the motion vector candidate list, wherein N is an integer number that is less than a maximum number of candidates;

based on the disparity motion vector candidate, determining a disparity shifted motion vector (DSMV) candidate by shifting the disparity motion vector candidate by ((PuWidth/2*4+4), (PuHeight/2*4+4)), wherein PuWidth is a width of a prediction unit (PU) of the block of video data and PuHeight is a height of the PU of the block of video data;

in response to a bottom-right inter-view predicted motion (IPMC) candidate being unavailable, adding the DSMV candidate to the motion vector candidate list;

determining a candidate from the motion vector candidate list; and encoding the current block using a motion vector corresponding to the determined candidate.

22. The method of claim 21, wherein identifying the disparity motion vector candidate comprises identifying a first available disparity motion vector candidate corresponding to a reference picture list from the first N candidates in the motion vector candidate list.

23. The method of claim 21, wherein N is equal to 2.

24. The method of claim 21, wherein the first N candidates comprise one or more virtual candidates.

25. The method of claim 21, wherein the first N candidates do not comprise virtual candidates.

26. The method of claim 21, wherein adding the DSMV candidate to the motion vector candidate list comprises assigning the DMSV candidate an index lower than virtual candidates in the motion vector candidate list.

27. The device of claim 7, wherein the device comprises a wireless communication device, further comprising a receiver configured to receive encoded video data.

28. The device of claim 7, wherein the wireless communication device comprises a telephone handset and wherein the receiver is configured to demodulate, according to a wireless communication standard, a signal comprising the encoded video data.

* * * * *